US012603729B2

(12) United States Patent
Matsuda et al.

(10) Patent No.: US 12,603,729 B2
(45) Date of Patent: Apr. 14, 2026

(54) TERMINAL DEVICE, BASE STATION DEVICE, METHOD FOR CONTROLLING TERMINAL DEVICE, AND METHOD FOR CONTROLLING BASE STATION DEVICE

(71) Applicant: Sony Group Corporation, Tokyo (JP)

(72) Inventors: Hiroki Matsuda, Saitama (JP); Hiromasa Uchiyama, Tokyo (JP); Naoki Kusashima, Tokyo (JP); Yifu Tang, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 817 days.

(21) Appl. No.: 17/633,545

(22) PCT Filed: Aug. 5, 2020

(86) PCT No.: PCT/JP2020/030010
§ 371 (c)(1),
(2) Date: Feb. 7, 2022

(87) PCT Pub. No.: WO2021/029296
PCT Pub. Date: Feb. 18, 2021

(65) Prior Publication Data
US 2022/0294569 A1 Sep. 15, 2022

(30) Foreign Application Priority Data

Aug. 14, 2019 (JP) ................................. 2019-148932

(51) Int. Cl.
*H04L 1/18* (2023.01)
*H04L 1/08* (2006.01)
(Continued)

(52) U.S. Cl.
CPC .............. *H04L 1/1812* (2013.01); *H04L 1/08* (2013.01); *H04W 72/044* (2013.01);
(Continued)

(58) Field of Classification Search
CPC ... H04W 72/044; H04W 72/20; H04W 76/20; H04L 1/1812; H04L 1/08
(Continued)

(56) References Cited

U.S. PATENT DOCUMENTS 12,219,443 B2 * 2/2025 Li ..................... H04W 72/1263
2010/0281322 A1 11/2010 Park
(Continued)

FOREIGN PATENT DOCUMENTS

CN 102215093 A 10/2011
CN 107431581 A 12/2017
(Continued)

OTHER PUBLICATIONS

U.S. Appl. No. 62/737,630 Claims (Year: 2018).*
(Continued)

*Primary Examiner* — Faisal Choudhury
(74) *Attorney, Agent, or Firm* — Wolf, Greenfield & Sacks, P.C.

(57) ABSTRACT

A terminal device includes a communication unit and a control unit. The control unit is configured to receive disabling information of hybrid automatic repeat request (HARQ) feedback via the communication unit, and recognize that one or more pieces of HARQ feedback indicated by the disabling information of the HARQ feedback are disabled, and the disabling information of the HARQ feedback is set for each cell, each beam, each component carrier, each bandwidth part (BWP), each user equipment (UE), or each HARQ process.

13 Claims, 12 Drawing Sheets

(51) Int. Cl.

| | |
|---|---|
| *H04L 1/1812* | (2023.01) |
| *H04W 72/04* | (2023.01) |
| *H04W 72/044* | (2023.01) |
| *H04W 72/20* | (2023.01) |
| *H04W 76/20* | (2018.01) |
| *H04W 84/06* | (2009.01) |

(52) U.S. Cl.
CPC ........... *H04W 72/20* (2023.01); *H04W 76/20* (2018.02); *H04W 84/06* (2013.01)

(58) Field of Classification Search
USPC ......................................................... 370/329
See application file for complete search history.

(56) References Cited

U.S. PATENT DOCUMENTS

| | | | |
|---|---|---|---|
| 2011/0294491 A1* | 12/2011 | Fong ..................... | H04L 5/0098 |
| | | | 455/422.1 |
| 2018/0097587 A1 | 4/2018 | Seo | |
| 2018/0167171 A1 | 6/2018 | Wu | |
| 2019/0140793 A1 | 5/2019 | Takeda et al. | |
| 2020/0077320 A1 | 3/2020 | Shimoda et al. | |
| 2020/0313806 A1* | 10/2020 | Wang .................... | H04L 1/1854 |
| 2021/0314092 A1* | 10/2021 | Wen ...................... | H04L 1/1896 |
| 2022/0039013 A1* | 2/2022 | Shi ..................... | H04W 52/0216 |
| 2022/0045803 A1* | 2/2022 | Lin ....................... | H04L 1/1822 |
| 2022/0239417 A1* | 7/2022 | Cheng ................... | H04L 1/1896 |
| 2022/0264614 A1* | 8/2022 | Yu .......................... | H04L 1/1825 |

FOREIGN PATENT DOCUMENTS

| | | |
|---|---|---|
| JP | 2017-034450 A | 2/2017 |
| JP | 2021-503856 A | 2/2021 |
| WO | WO 2018/124259 A1 | 7/2018 |
| WO | WO 2019/101146 A1 | 5/2019 |
| WO | WO 2019/130524 A1 | 7/2019 |

OTHER PUBLICATIONS

U.S. Appl. No. 62/737,630 Drawings (Year: 2018).*
U.S. Appl. No. 62/737,630 Specification (Year: 2018).*

International Search Report and English translation thereof mailed Nov. 2, 2020 in connection with International Application No. PCT/JP2020/030010.
[No Author Listed], Consideration on HARQ in NTN. Nokia, Nokia Shanghai Bell. 3GPP TSG RAN WG1 Meeting #97, R1-1906088. Reno, USA, May 13-17, 2019. 3 pages.
[No Author Listed], Revised SID for Study on solutions for NR to support non-terrestrial networks (NTN). 3GPP TSG RAN meeting #83, RP-190710. Shenzen, China, Mar. 18-21, 2019. 6 pages.
[No Author Listed], Summary for more delay-tolerant re-transmission mechanisms in NR-NTN. MediaTek Inc. 3GPP TSG RAN WGI Meeting #97, R1-1907757. https://www.3gpp.org/ftp/tsg_ran/WG1_RL1/TSGR1_97/Docs/R1-1907757.zip [retrieved Oct. 26, 2020] Reno, Nevada, USA, May 13-17, 2019. 9 pages.
International Written Opinion and English translation thereof mailed Nov. 2, 2020 in connection with International Application No. PCT/JP2020/030010.
International Preliminary Report on Patentability and English translation thereof mailed Feb. 24, 2022 in connection with International Application No. PCT/JP2020/030010.
Supplementary European Search Report issued Aug. 29, 2022 in connection with European Application No. 20853166.5.
CATT: "HARQ consideration for NTN", 3GPP Draft; RI-1906326, 3rd Generation Partnership Project (3GPP), Mobile Competence Centre ; 650, Route Des Lucioles ; F-06921 Sophia-Antipolis Cedex; France vol. RAN WG1, No. Reno, USA; May 13, 2019-May 17, 2019 May 13, 2019 (May 13, 2019), XP051727776.
Mediatek Inc: "Summary Delay-tolerant re-transmission mechanisms in NR-NTN", 3GPP Draft; Ri-1905840—3rd Generation Partnership Project (3GPP), Mobile Competence Centre ; 650, Route Des Lucioles ; F-06921 Sophia vol. RAN WG1, No. Xi'an, China; Apr. 8, 2019-Apr. 12, 2019 Apr. 15, 2019 (Apr. 15, 2019), XP051707886.
Nokia et al: "Consideration on HARQ Impact for NTN",3GPP Draft; RI-1807665, 3rd Generation Partnership Project (3GPP), Mobile Competence Centre ; 650, Route Des Lucioles ; F-06921 Sophia-Antipolis Cedex; France/vol. RAN WG1, No. Busan, Korea; May 21, 2018-May 25, 2018 May 24, 2018 (May 24, 2018), XP051463296.
Huawei, Hisilicon, "Discussion on data transmission related procedures for NTN", 3GPP TSG RAN WG1 Meeting #95, R1-1813662, Spokane, USA, Nov. 12-16, 2018, pp. 1-3.
Office Action for Japanese Application No. 2024-201629, mailed Jan. 20, 2026.

* cited by examiner

Figure 8:
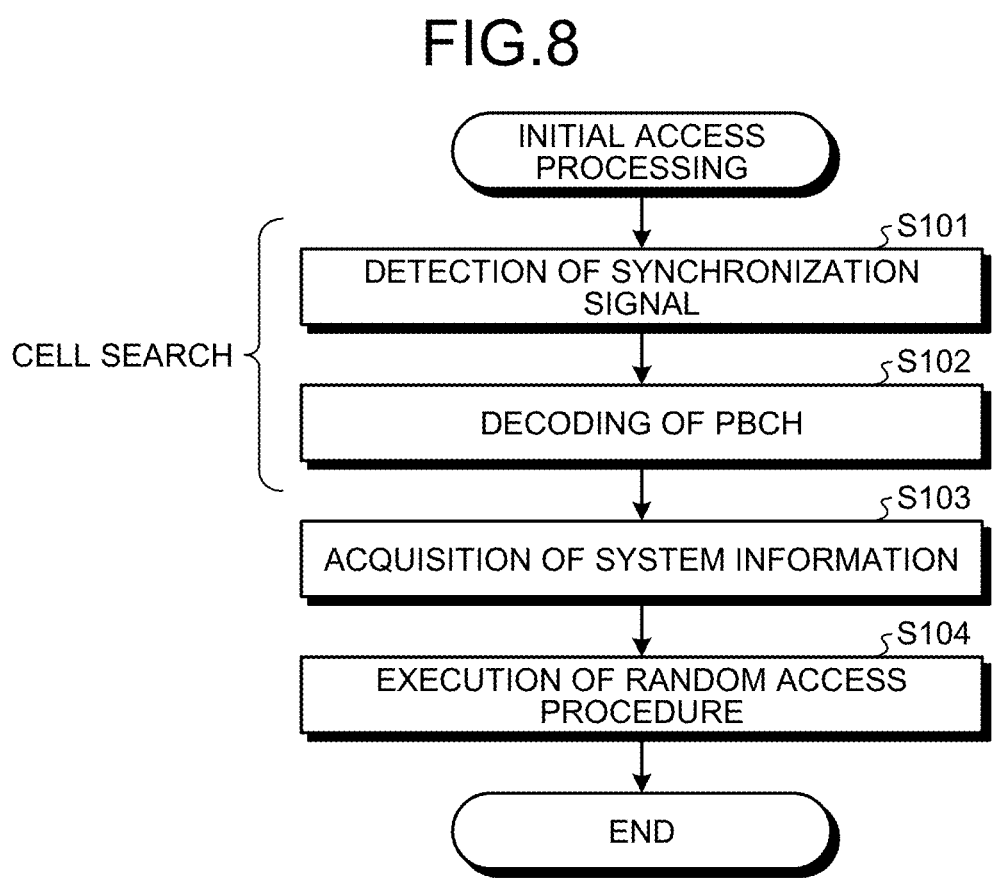

INITIAL ACCESS
PROCESSING

S101
DETECTION OF SYNCHRONIZATION
SIGNAL

CELL SEARCH

S102
DECODING OF PBCH

S103
ACQUISITION OF SYSTEM INFORMATION

S104
EXECUTION OF RANDOM ACCESS
PROCEDURE

END

FIG.9

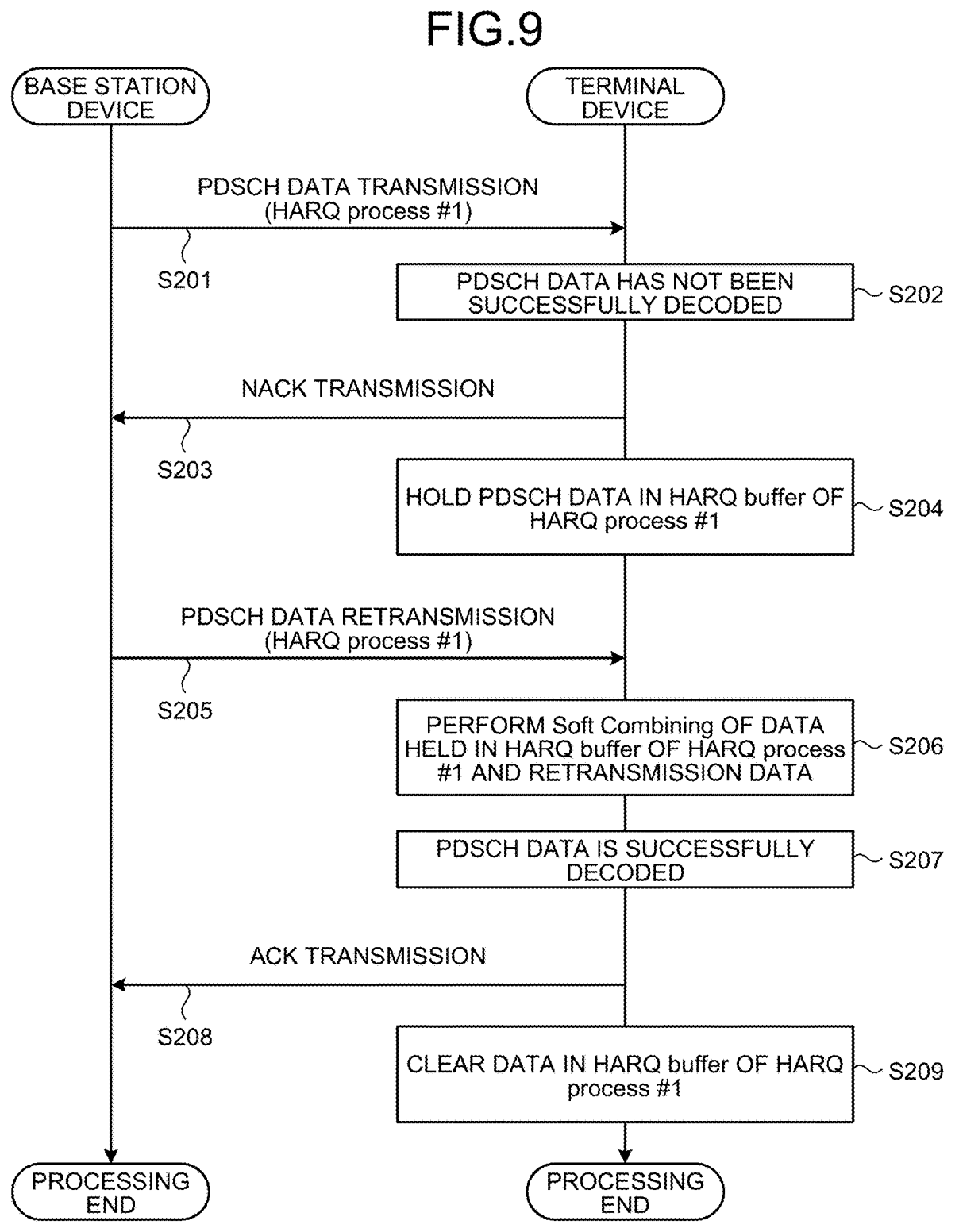

```
┌──────────────┐                    ┌──────────────┐
│ BASE STATION │                    │   TERMINAL   │
│    DEVICE    │                    │    DEVICE    │
└──────────────┘                    └──────────────┘
        │                                   │
        │   PDSCH DATA TRANSMISSION         │
        │      (HARQ process #1)            │
        │─────────────────────────────────▶│
        │  S201                             │
        │            ┌──────────────────────────────────┐
        │            │ PDSCH DATA HAS NOT BEEN           │ ～ S202
        │            │ SUCCESSFULLY DECODED              │
        │            └──────────────────────────────────┘
        │                                   │
        │        NACK TRANSMISSION          │
        │◀─────────────────────────────────│
        │  S203                             │
        │            ┌──────────────────────────────────┐
        │            │ HOLD PDSCH DATA IN HARQ buffer OF │ ～ S204
        │            │ HARQ process #1                   │
        │            └──────────────────────────────────┘
        │                                   │
        │  PDSCH DATA RETRANSMISSION        │
        │      (HARQ process #1)            │
        │─────────────────────────────────▶│
        │  S205                             │
        │            ┌──────────────────────────────────┐
        │            │ PERFORM Soft Combining OF DATA    │ ～ S206
        │            │ HELD IN HARQ buffer OF HARQ process│
        │            │ #1 AND RETRANSMISSION DATA        │
        │            └──────────────────────────────────┘
        │            ┌──────────────────────────────────┐
        │            │ PDSCH DATA IS SUCCESSFULLY        │ ～ S207
        │            │ DECODED                           │
        │            └──────────────────────────────────┘
        │                                   │
        │        ACK TRANSMISSION           │
        │◀─────────────────────────────────│
        │  S208                             │
        │            ┌──────────────────────────────────┐
        │            │ CLEAR DATA IN HARQ buffer OF HARQ │ ～ S209
        │            │ process #1                        │
        │            └──────────────────────────────────┘
        │                                   │
        ▼                                   ▼
┌──────────────┐                    ┌──────────────┐
│ PROCESSING   │                    │ PROCESSING   │
│    END       │                    │    END       │
└──────────────┘                    └──────────────┘
```

TERMINAL DEVICE, BASE STATION DEVICE, METHOD FOR CONTROLLING TERMINAL DEVICE, AND METHOD FOR CONTROLLING BASE STATION DEVICE

CROSS-REFERENCE TO RELATED APPLICATIONS

This application claims the benefit under 35 U.S.C. § 371 as a U.S. National Stage Entry of International Application No. PCT/JP2020/030010, filed in the Japanese Patent Office as a Receiving Office on Aug. 5, 2020, which claims priority to Japanese Patent Application Number JP2019-148932, filed in the Japanese Patent Office on Aug. 14, 2019, each of which is hereby incorporated by reference in its entirety.

FIELD

Embodiments of the present invention relate to a terminal device, a base station device, a method for controlling a terminal device, and a method for controlling a base station device.

BACKGROUND

In the 3rd generation partnership project (3GPP) Rel. 15 new radio (NR), hybrid automatic repeat request (HARQ) is supported similarly to long term evolution (LTE). In the HARQ, error correction is performed by soft combining the first transmission data and retransmitted data. As a result, a coding gain can be obtained. This processing is performed for each process called "HARQ process". That is, in a case where there is a plurality of (for example, 16) HARQ processes, it is possible to perform HARQ processing in parallel.

Since various use cases are assumed in the NR, the number of HARQ processes may be insufficient depending on the use case. For example, in the case of low delay processing and low delay communication (for example, ultra-reliable and low latency communications (URLLC)), there is a possibility that data is received one after another in a short time, and the number of HARQ processes may be insufficient because the HARQ processing is not in time. Furthermore, in the case of non-terrestrial network (NTN) communication, a delay in HARQ process processing occurs due to a propagation delay, and the number of HARQ processes may be insufficient. Regarding the shortage of the number of HARQ processes, deactivating or disabling HARQ feedback is known.

CITATION LIST

Non Patent Literature

Non Patent Literature 1: PR-190710 Revised SID for Study on solutions for NR to support non-terrestrial networks (NTN)
Non Patent Literature 2: R1-1906088, Nokia, Nokia Shanghai Bell, "Consideration on HARQ in NTN," 3GPP TSG RAN1 Meeting #97, Reno, USA, May, 2019

SUMMARY

Technical Problem

However, in the above-described prior arts, a specific method of HARQ feedback disabling has not been sufficiently studied. A detailed configuration method of HARQ feedback disabling for the terminal device is unclear. Therefore, the shortage of the number of HARQ processes may not be resolved, and a desired communication quality may not be obtained.

Therefore, an object of the present disclosure is to provide a terminal device, a base station device, a method for controlling a terminal device, and a method for controlling a base station device that contribute to obtaining desired communication quality.

Solution to Problem

To solve the problems described above, a terminal device according to an embodiment of the present disclosure includes a communication unit and a control unit. The control unit is configured to receive disabling information of hybrid automatic repeat request (HARQ) feedback via the communication unit, and recognize that one or more pieces of HARQ feedback indicated by the disabling information of the HARQ feedback are disabled, and the disabling information of the HARQ feedback is set for each cell, each beam, each component carrier, each bandwidth part (BWP), each user equipment (UE), or each HARQ process.

BRIEF DESCRIPTION OF DRAWINGS

FIG. 1 is a diagram illustrating a configuration example of a communication system according to an embodiment of the present disclosure.
FIG. 2 is a diagram illustrating an example of a wireless network provided by a communication system.
FIG. 3 is a diagram illustrating an outline of satellite communication provided by a communication system.
FIG. 8 is a flowchart illustrating an example of initial access processing.
FIG. 9 is a sequence diagram illustrating an example of a HARQ procedure.

DESCRIPTION OF EMBODIMENTS

Figure 4:
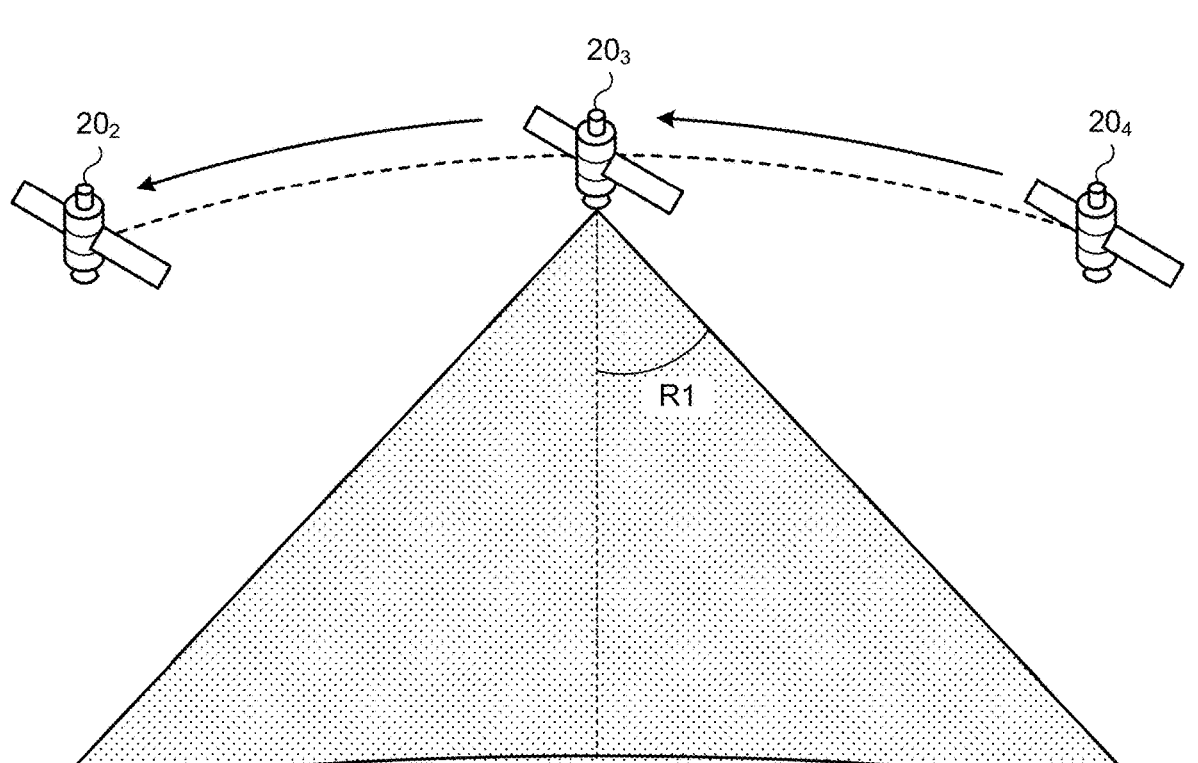
FIG. 4 is a diagram illustrating an example of a cell configured by a satellite station.

Hereinafter, embodiments of the present disclosure will be described in detail with reference to the drawings. In each of the embodiments below, the same parts are designated by the same reference numerals, so that duplicate description will be omitted.

In the present specification and the drawings, a plurality of components having substantially the same functional configuration may be distinguished by attaching different numerals after the same reference numerals. For example, a plurality of configurations having substantially the same functional configuration is distinguished as terminal devices $50_1$, $50_2$, and $50_3$ as necessary. However, in a case where it is not particularly necessary to distinguish each of a plurality of components having substantially the same functional configuration, only the same reference numeral is attached. For example, in a case where it is not particularly necessary to distinguish the terminal devices $50_1$, $50_2$, and $50_3$, they are simply referred to as a terminal device 50.

The present disclosure will be described according to the order of items shown below.

1. Introduction
2. Embodiments
2-1. Overall configuration of communication system
2-2. Configuration of management device
2-3. Configuration of base station
2-4. Configuration of relay station
2-5. Configuration of terminal device
2-6. Initial access processing
2-7. Example of HARQ procedure
2-8. Propagation delay problem
2-9. Outline of embodiments
2-10. Example of HARQ disabling processing (downlink)
2-11. Example of HARQ disabling processing (uplink)
2-12. Characteristic compensation supporting HARQ disabling
3. Modification
3-1. Modification in a case where the number of HARQ processes can be increased
3-2. Other modifications
4. Conclusion

1. INTRODUCTION

Radio access technologies such as LTE and NR have been studied in 3GPP. LTE and NR are types of cellular communication technology, and enable mobile communication of a terminal device by arranging a plurality of areas covered by a base station in a cell shape. In the following description, it is assumed that "LTE" includes LTE-Advanced (LTE-A), LTE-Advanced Pro (LTE-A Pro), and Evolved Universal Terrestrial Radio Access (EUTRA)). In addition, it is assumed that the NR includes New Radio Access Technology (NRAT) and Further EUTRA (FEUTRA).

NR is a radio access technology (RAT) of a next generation (fifth generation) of LTE. NR is a radio access technology that can support various use cases including enhanced mobile broadband (eMBB), massive machine type communications (mMTC), and URLLC. NR has been studied aiming at a technical framework supporting usage scenarios, requirements, arrangement scenarios, and the like in these use cases.

For example, with an increase in demand for wide area coverage, connection stability, and the like, studies on a non-terrestrial network (NTN) have been started as one of use cases of NR. In a non-terrestrial network, a wireless network is scheduled to be provided to a terminal device via a base station other than a ground station, such as a satellite station or an aircraft station. The base station other than the ground station is referred to as a non-ground station or a non-ground base station. A wireless network provided by a ground station is referred to as a terrestrial network (TN). By using the same radio access scheme for the terrestrial network and the non-terrestrial network, integrated operation of the terrestrial network and the non-terrestrial network becomes possible.

In the embodiments of the present disclosure, a ground station (also referred to as a ground base station) refers to a base station (including a relay station) installed on the ground. The "ground" is a ground in a broad sense including not only the ground (land) but also the underground, on the water, and underwater.

In some embodiments, an application example to NTN will be described as one of use cases of NR. However, the application destination of these embodiments is not limited to NTN, and may be applied to other technologies and use cases (e.g., URLLC).

2. EMBODIMENTS

A communication system 1 according to the present embodiment will be described below. The communication system 1 includes a non-ground station and provides a terminal device with radio communication using a non-terrestrial network. In addition, the communication system 1 may provide radio communication using a terrestrial network. The non-terrestrial network and the terrestrial network included in the communication system 1 are not limited to the wireless network using the radio access scheme defined by NR. The non-terrestrial network included in the communication system 1 may be a wireless network of a radio access scheme other than NR, such as LTE, Wideband Code Division Multiple Access (W-CDMA), or Code Division Multiple Access 2000 (cdma 2000).

In the following description, the concept of the base station (hereinafter, also referred to as a base station device) may include a relay station (hereinafter, also referred to as a relay device (relay node)) and a donor base station that provides a wireless interface to the relay station. In addition, the concept of the base station includes not only a structure having a function of the base station but also a device installed in the structure. The structure is, for example, a building such as a high-rise building, a house, a steel tower, a station facility, an airport facility, a harbor facility, or a stadium. The concept of a structure includes not only a building but also a construction (non-building structure) such as a tunnel, a bridge, a dam, a wall, or an iron pillar, and equipment such as a crane, a gate, or a windmill. Moreover, the concept of the structure includes not only a structure on the ground (land) or under the ground but also a structure on water such as a platform or a megafloat and a structure under water such as a marine observation facility. Furthermore, the base station may be configured by a set of a plurality of physical or logical devices. For example, in the embodiments of the present disclosure, a base station may be distinguished into a plurality of devices of a baseband unit (BBU) and a radio unit (RU), and may be interpreted as an assembly of the plurality of devices. Additionally or alternatively, in the embodiments of the present disclosure, the base station may be either or both of a BBU and an RU. The BBU and the RU may be connected by a predetermined interface (e.g., eCPRI). Additionally or alternatively, the RU may be referred to as Remote Radio Unit (RRU) or Radio DoT (RD). Additionally or alternatively, the RU may correspond to the gNB-DU described later. Additionally or alternatively, the BBU may correspond to a gNB-CU described later. Additionally or alternatively, the RU may be a device integrally formed with an antenna. An antenna (e.g., antenna integrally formed with RU) included in the base station may adopt an advanced antenna system and support MIMO (e.g. FD-MIMO) or beamforming. In the advanced antenna system, an antenna (e.g., antenna integrally formed with RU) included in a base station may include, for example, 64 transmission antenna ports and 64 reception antenna ports.

The base station may be a base station configured to be movable. For example, the base station may be a device installed in a moving body or may be a moving body itself. The moving body may be a mobile terminal such as a smartphone, a moving body (for example, a vehicle such as an automobile, a bus, a truck, a train, or a linear motor car) that moves on the ground (land), or a moving body (for example, the subway) that moves in the ground (for example, in the tunnel). In addition, the moving body may be a moving body (for example, a ship such as a passenger ship, a cargo ship, or a hovercraft) that moves over water or a moving body (for example, submersibles such as submersibles, submersibles, and unmanned submersibles) that moves under water. Moreover, the moving body may be a moving body (for example, an aircraft such as an airplane, an airship, or a drone) that moves inside the atmosphere or a space moving body (for example, artificial bodies such as artificial satellites, spacecraft, space stations, and probes) that moves outside the atmosphere.

A plurality of base stations may be connected to each other. One or more base stations may be included in a radio access network (RAN). That is, the base station may be simply referred to as a RAN, a RAN node, an access network (AN), or an AN node. RAN in LTE is referred to as an enhanced universal terrestrial RAN (EUTRAN). RAN in NR is referred to as NGRAN. RAN in W-CDMA (UMTS) is referred to as UTRAN. The base station of LTE is referred to as an evolved node B (eNodeB) or an eNB. That is, the EUTRAN includes one or more eNodeBs (eNBs). An NR base station is referred to as a gNodeB or a gNB. That is, the NGRAN includes one or more gNBs. Furthermore, the EUTRAN may include a gNB (en-gNB) connected to a core network (EPC) in an LTE communication system (EPS). As similar to this, the NGRAN may include an ng-eNB connected to the core network 5GC in the 5G communications system (5GS). Additionally or alternatively, when the base station is an eNB, a gNB, or the like, the base station may be referred to as 3GPP Access. Additionally or alternatively, when the base station is a radio access point (Access Point), the base station may be referred to as Non-3 GPP Access. Additionally or alternatively, the base station may be an optical extension device called a remote radio head (RRH). Additionally or alternatively, when the base station is a gNB, the base station may be referred to as a combination of the gNB CU (Central Unit) and the gNB DU (Distributed Unit) described above or any of them. The gNB Central Unit (CU) hosts a plurality of higher layers (e.g. RRC, SDAP, PDCP) of the Access Stratum for communication with the UE. On the other hand, the gNB-DU hosts a plurality of lower layers (e.g., RLC, MAC, PHY) of the Access Stratum. That is, among message information to be described later, RRC signalling (semi-static notification) may be generated by the gNB CU, while DCI (dynamic notification) may be generated by the gNB-DU. Additionally or alternatively, in the RRC configuration (semi-static notification), for example, some configurations such as IE: cellGroupConfig may be generated by the gNB-DU, and the remaining configurations may be generated by the gNB-CU. These configurations may be transmitted and received by an F1 interface to be described later. The base station may be configured to be able to communicate with other base stations. For example, when a plurality of base station devices is eNBs or a combination of an eNB and an en-gNB, the base stations may be connected by an X2 interface. Additionally or alternatively, when a plurality of base stations is gNBs or a combination of a gn-eNB and a gNB, the devices may be connected by an Xn interface. Additionally or alternatively, when a plurality of base stations is a combination of a gNB central unit (CU) and a gNB distributed unit (DU), the devices may be connected by the above-described F1 interface. Message and information (RRC signalling or DCI information) to be described later may be communicated between a plurality of base stations (e.g. via X2, Xn, F1 interface).

In LTE and NR, a terminal device (also referred to as a mobile station, a mobile station device, or a terminal) may be referred to as user equipment (UE). Alternatively, the terminal device may be referred to as a mobile station (MS) or a wireless transmission reception unit (WTRU). The terminal device is a type of radio communication device, and is also referred to as a mobile station, a mobile station device, or a terminal. In the embodiment of the present disclosure, the concept of the terminal device includes not only a portable terminal device such as a mobile terminal but also a device installed in a structure or a moving body, for example.

<2-1. Overall Configuration of Communication System>

Figure 1:
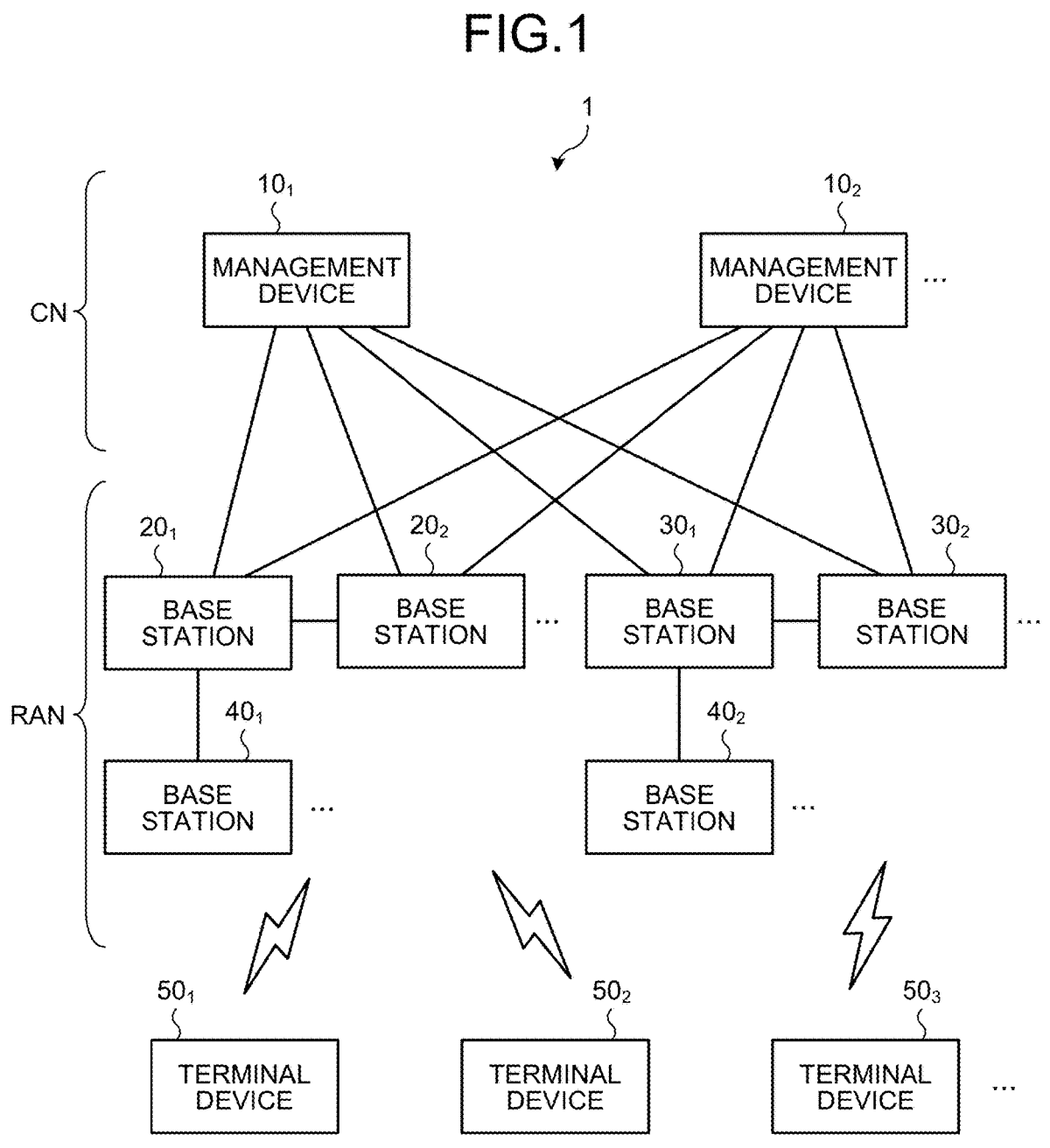

FIG. 1 is a diagram illustrating a configuration example of the communication system 1 according to an embodiment of the present disclosure. The communication system 1 includes a management device 10, a non-ground base station (hereinafter, simply referred to as a base station) 20, a ground base station (hereinafter, simply referred to as a base station) 30, a relay device (hereinafter, simply referred to as a base station) 40, and a terminal device 50. The communication system 1 provides the user with a wireless network capable of mobile communication by the radio communication devices constituting the communication system 1 operating in cooperation. The radio communication device is a device having a radio communication function, and corresponds to the base stations 20, 30, 40 and the terminal device 50 in the example of FIG. 1.

The communication system 1 may include a plurality of management devices 10, a plurality of base stations 20, 30, 40, and a plurality of terminal devices 50. In the example of FIG. 1, the communication system 1 includes management devices $10_1$, $10_2$, and the like as the management device 10. The communication system 1 includes base stations $20_1$, $20_2$, and the like as the base station 20, and includes base stations $30_1$, $30_2$, and the like as the base station 30. The communication system 1 includes base stations $40_1$, $40_2$, and the like as the base station 40, and includes terminal devices $50_1$, $50_2$, $50_3$, and the like as the terminal device 50. As described above, the application destination of the embodiment of the present disclosure is not limited to non-terrestrial communication (NTN). That is, the communication system may not include a non-ground station.

The management device 10 is a device that manages a wireless network. For example, the management device 10 is a device that functions as a mobility management entity (MME) or an access and mobility management function (AMF). The MME is connected to the EUTRAN via the S1 interface, and controls non-access stratum (NAS) signaling with the UE and manages mobility of the UE. The AMF is connected by an NGRAN and an NG interface, and controls non-access stratum (NAS) signaling with the UE and manages mobility of the UE. The management device 10 may be included in the core network CN. The core network CN is, for example, an evolved packet core (EPC) or a 5G core network (5GC). The management device 10 is connected to each of the plurality of base stations 20 and the plurality of base stations 30. The management device 10 manages communication between the base station 20 and the base station 30. The core network transfers user data between a packet data network (PDN) or a data network (DN) and a RAN in addition to a control plane (C-Plane) node such as the management device 10. A user plane (U-Plane) node may be included. The U-Plane node in the EPC may include a Serving Gateway (S-GW) or a PDN-Gateway (P-GW). The U-Plane node in the 5GC may include a U-Plane Function (UPF). For example, the management device 10 manages the position of the terminal device 50 (UE) in the communication system 1 for each terminal device 50 in units of areas (e.g. Tracking Area, RAN Notification Area) including a plurality of cells. The management device 10 may grasp and manage, for each terminal device 50 in units of cells, the base station (or cell) to which the terminal device is, the base station (or cell) in which the terminal device 50 exists in a communication area, and the like.

The base station 20 is a base station that wirelessly communicates with the terminal device 50. In the example of FIG. 1, the base station 20₁ is connected to the base station 40₁, and can also wirelessly communicate with the terminal device 50 via the base station 40₁. In the present embodiment, the base station 20 is a base station capable of floating in the air or space. For example, the base station 20 is a non-ground station device such as an aircraft station or a satellite station.

The aircraft station is, for example, a radio communication device capable of floating in the atmosphere, such as an aircraft. The aircraft station may be, for example, a device mounted on an aircraft or the like, or may be an aircraft itself. The concept of an aircraft includes not only heavy aircraft such as an airplane and a glider but also light aircraft such as a balloon and an airship. In addition, the concept of an aircraft includes not only a heavy aircraft and a light aircraft but also a rotorcraft such as a helicopter and an autogyroscope. The aircraft station (or an aircraft on which an aircraft station is mounted) may be an unmanned aerial vehicle such as a drone. The concept of the unmanned aerial vehicle also includes an unmanned aircraft system (UAS) and a tethered UAS. The concept of unmanned aerial vehicles also includes Lighter than Air UAS (LTA) and Heavy than Air UAS (HTA). Other concepts of unmanned aerial vehicles also include High Altitude UAS Platforms (HAPs). When an aircraft station serves as a UE, the aircraft station may be an aerial UE.

A satellite station is a radio communication device capable of floating outside the atmosphere. The satellite station may be a device mounted on a space vehicle such as an artificial satellite, or may be a space vehicle itself. The satellite serving as the satellite station may be any of a low earth orbiting (LEO) satellite, a medium earth orbiting (MEO) satellite, a geostationary earth orbiting (GEO) satellite, and a highly elliptical orbiting (HEO) satellite. Of course, the satellite station may be a device mounted on a low earth orbiting satellite, a medium earth orbiting satellite, a geostationary earth orbiting satellite, or a highly elliptical orbiting satellite.

The base station 30 is a base station that wirelessly communicates with the terminal device 50. In the example of FIG. 1, the base station 30₁ is connected to the base station 40₂, and can also wirelessly communicate with the terminal device 50 via the base station 40₂. The base station 30 may be a base station arranged in a structure on the ground or may be a base station installed in a moving body moving on the ground. For example, the base station 30 is an antenna installed in a structure such as a building and a signal processing device connected to the antenna. Of course, the base station 30 may be a structure or a moving body itself.

The base station 40 is a device serving as a relay station of the base station. The base station 40 is a type of base station. The base station 40 relays communication between the base station 20 and the terminal device 50 or communication between the base station 30 and the terminal device 50. The base station 40 may be a ground station or a non-ground station. The base station 40 may constitute a radio access network RAN together with the base station 20 and the base station 30.

The terminal device 50 is, for example, a mobile phone, a smart device (smartphone or tablet), a personal digital assistant (PDA), or a personal computer. In addition, the terminal device 50 may be a machine to machine (M2M) device or an Internet of things (IoT) device (for example, may be referred to as MTC UE, NB-IoT UE, or Cat.M UE). Moreover, the terminal device 50 may be a radio communication device installed in a moving body or may be a moving body itself. Note that, the terminal device 50 may be a relay station that relays satellite communication, or may be a base station that receives satellite communication. The terminal device 50 supports both a terrestrial network and a non-terrestrial network. Therefore, the terminal device 50 can communicate not only with the ground station device such as the base station 30 but also with the non-ground station device such as the base station 20.

Figure 2:
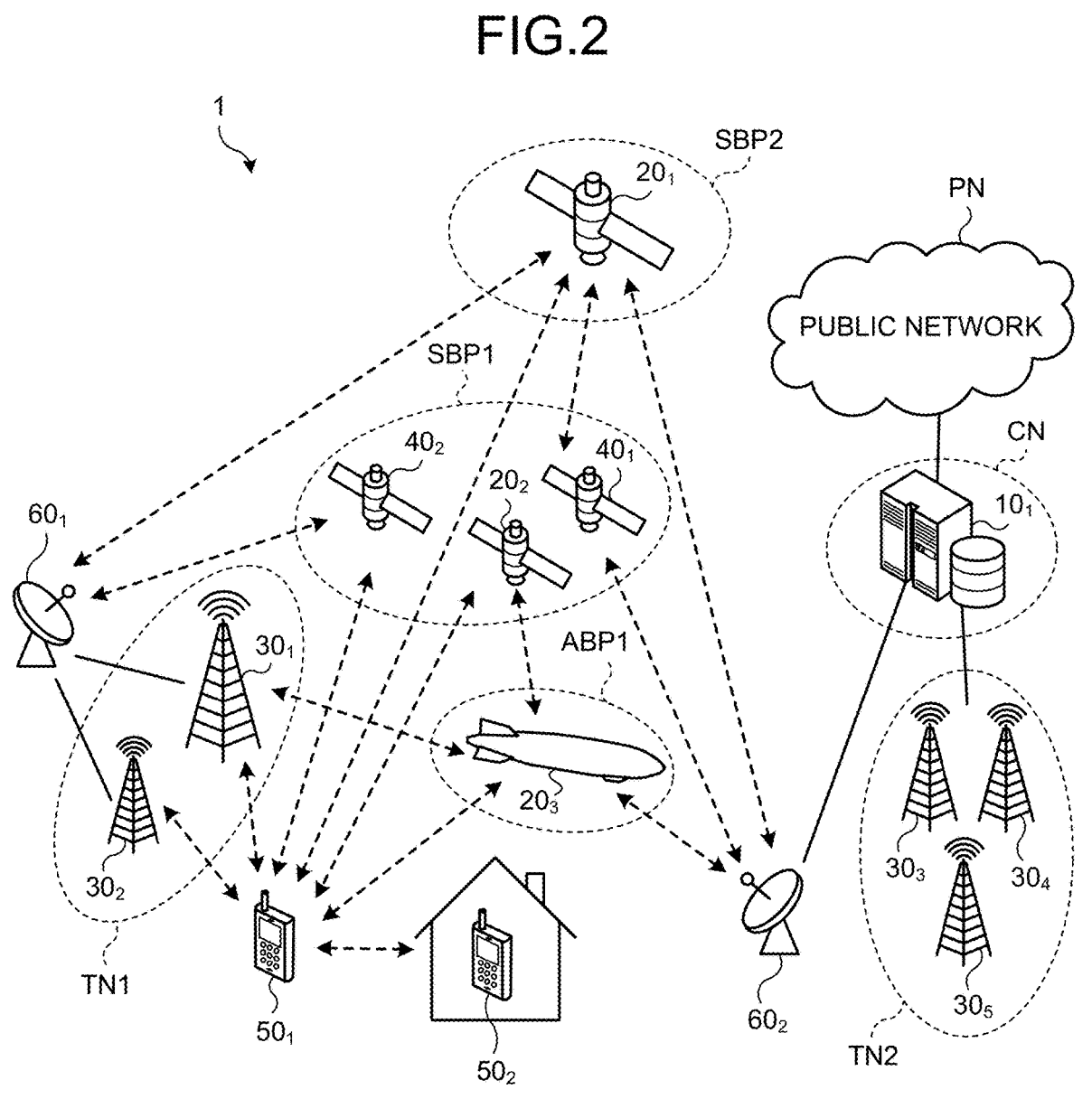

FIG. 2 is a diagram illustrating an example of a wireless network provided by the communication system 1. Each of the base station 20 and the base station 30 constitutes a cell. A cell is an area in which radio communication is covered by a base station. The cell constituted by the base station 20 and the base station 30 may be any of a macro cell, a micro cell, a femto cell, and a small cell. The communication system 1 may be configured to manage a plurality of cells by a single base station, or may be configured to manage one cell by a plurality of base stations. A cell provided by the base station is referred to as a serving cell. The serving cell includes a primary cell (PCell) and a secondary cell (SCell). In a case where the dual connectivity (e.g. EUTRA-EUTRA Dual Connectivity, EUTRA-NR Dual Connectivity (ENDC), EUTRA-NR Dual Connectivity with 5GC, NR-EUTRA Dual Connectivity (NEDC), NR-NR Dual Connectivity) is provided to the UE (e.g. terminal device 50), the PCell and zero or one or more SCells provided by a master node (MN) are referred to as a master cell group. The serving cell may include a primary secondary cell or primary SCG cell (PSCell). That is, in a case where the dual connectivity is provided to the UE, the PSCell and zero or one or more SCells provided by a secondary node (SN) are referred to as a secondary cell group (SCG). Unless specially configured (e.g., PUCCH on SCell), the physical uplink control channel (PUCCH) is transmitted in the PCell and the PSCell, but is not transmitted in the SCell. A radio link failure is also detected in the PCell and the PSCell, but is not detected in the SCell (may not be detected). As described above, since the PCell and the PSCell have a special role in the serving cell(s), they are also referred to as special cells (SpCells). One downlink component carrier and one uplink component carrier may be associated with one cell. A system bandwidth corresponding to one cell may be divided into a plurality of bandwidth parts. In this case, one or more bandwidth parts may be configured for the UE, and one bandwidth part may be used for the UE as an active BWP.

Radio resources (for example, a frequency band, a numerology (subcarrier spacing), and a slot format (slot configuration)) that can be used by the terminal device 50 may be different for each cell, each component carrier, or each BWP.

In the example of FIG. 2, the base stations $30_1$ and $30_2$ constitute a terrestrial network TN1, and the base stations $30_3$, $30_4$, $30_5$ constitute a terrestrial network TN2. The terrestrial network TN1 and the terrestrial network TN2 are, for example, terrestrial networks operated by a radio communication carrier (mobile network operator (MNO)) such as a telephone company. The terrestrial network TN1 and the terrestrial network TN2 may be operated by different radio communication carriers (i.e., MNOs with different PLMNs), or may be operated by the same radio communication carrier. The terrestrial network TN1 and the terrestrial network TN2 can be regarded as one terrestrial network.

The terrestrial network TN1 and the terrestrial network TN2 are each connected to a core network. In the example of FIG. 2, the base station 30 constituting the terrestrial network TN2 is connected to the core network CN constituted by the management device $10_1$ and the like. If the radio access scheme of the terrestrial network TN2 is LTE, the core network CN is EPC. When the radio access scheme of the terrestrial network TN2 is NR, the core network CN is the 5GC. Of course, the core network CN is not limited to the EPC or the 5GC, and may be a core network of another radio access scheme. In the example of FIG. 2, the terrestrial network TN1 is not connected to the core network, but the terrestrial network TN1 may be connected to the core network CN. The terrestrial network TN1 may be connected to a core network (not illustrated) different from the core network CN.

The core network CN includes a gateway device, a gateway switch, and the like, and is connected to a public network PN via a gateway device. The public network PN is, for example, a public data network such as the Internet, a regional IP network, or a telephone network (mobile telephone networks, fixed telephone networks, or the like). The gateway device is, for example, a server device connected to the Internet, a regional IP network, or the like. The gateway switch is, for example, a switch connected to a telephone network of a telephone company. The management device $10_1$ may have a function as a gateway device or a gateway switch.

Each of the base station 20 and the base station 40 illustrated in FIG. 2 is a non-ground station device such as a satellite station or an aircraft station. A satellite station group (or a single satellite station) constituting a non-terrestrial network is referred to as a spaceborne platform. A group of aircraft stations (or a single aircraft station) constituting a non-terrestrial network is referred to as an airborne platform. In the example of FIG. 2, the base station $20_2$, the base station $40_1$, and the base station $40_2$ constitute a space borne platform SBP1, and the base station $20_1$ constitutes a space borne platform SBP2. The base station $20_3$ configures the air borne platform ABP1.

The terminal device 50 can communicate with both the base station 30 and the base station 20. In the example of FIG. 2, the terminal device $50_1$ can communicate with the base station 30 constituting the terrestrial network TN1. The terminal device $50_1$ can communicate with the base station 20 constituting the space borne platforms SBP1 and SBP2. The terminal device $50_1$ can also communicate with the base station 20 constituting the air borne platform ABP1. The terminal device $50_1$ may be able to directly communicate with another terminal device 50 (the terminal device $50_2$ in the example of FIG. 2).

The base station 20 is connected to a terrestrial network or a core network via a relay station 60. The base stations 20 constituting the space borne platforms SBP1, SBP2 are connected to the terrestrial network TN1 via a relay station $60_1$. The base stations 20 constituting the space borne platforms SBP1, SBP2 and the air borne platform ABP1 are connected to the core network CN via a relay station $60_2$. The base stations 20 can directly communicate with each other without the relay station 60.

The relay station 60 is, for example, an aircraft station or an earth station. The aircraft station is a wireless station installed on the ground or a moving body moving on the ground in order to communicate with an aircraft station. The earth station is a wireless station located on the earth (including air) in order to communicate with a satellite station (space station). The earth station may be a large earth station or a small earth station such as a very small aperture terminal (VSAT). The earth station may be a VSAT controlled earth station (also referred to as a master station or a HUB station) or a VSAT earth station (also referred to as a slave station). The earth station may be a wireless station installed in a moving body moving on the ground. For example, as an earth station mounted on a ship, there is an earth station on board vessels (ESV). The earth station may include an aircraft earth station that is installed in an aircraft (including helicopters) and communicates with a satellite station. The earth station may include an aeronautical earth station that is installed on a moving body moving on the ground and communicates with the aircraft earth station via a satellite station. The relay station 60 may be a portable and movable wireless station that communicates with a satellite station or an aircraft station. The relay station 60 can be regarded as a part of the communication system 1.

Figure 3:
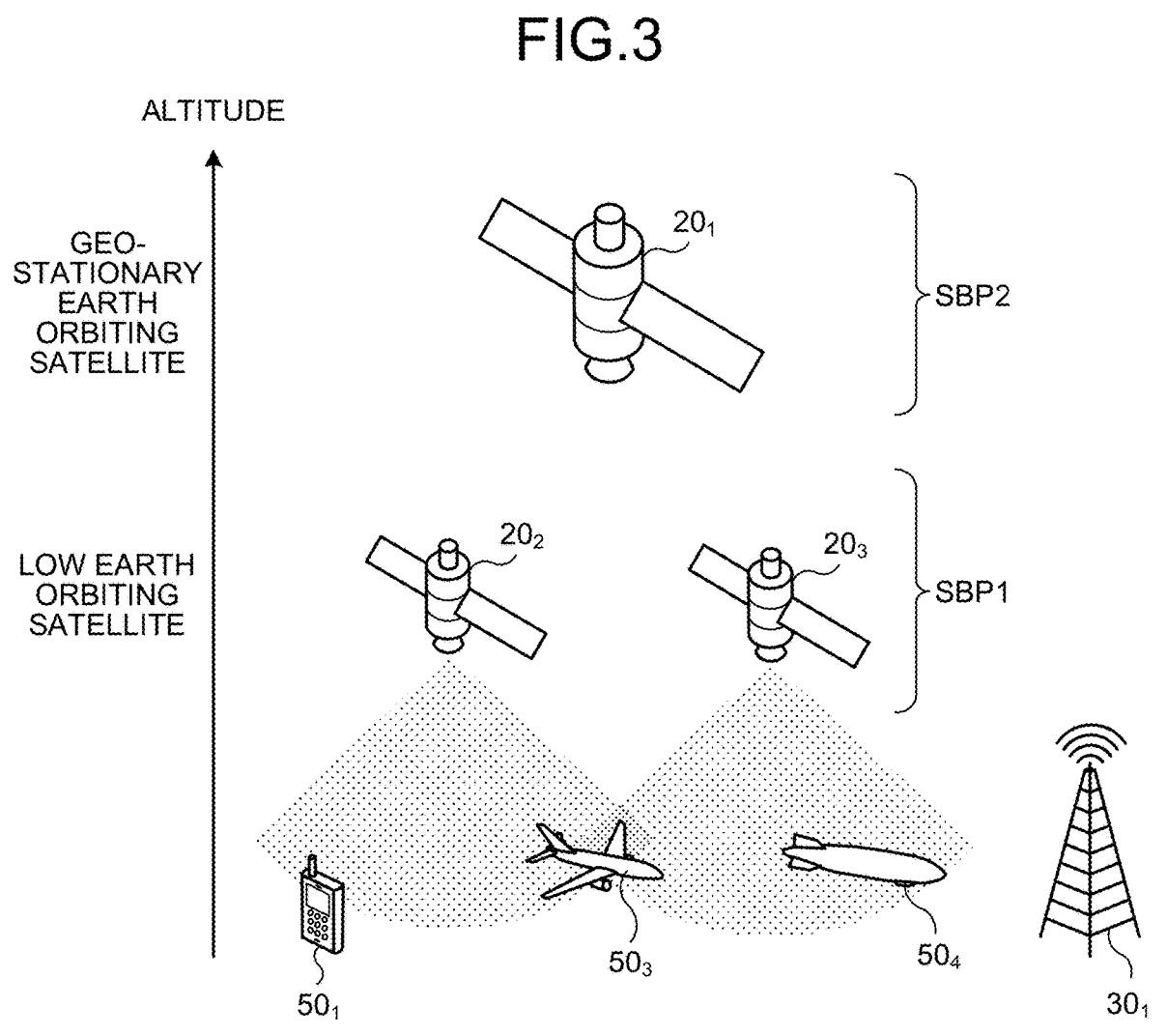

Each device constituting the space borne platforms SBP1, SBP2 performs satellite communication with the terminal device 50. The satellite communication is radio communication between the satellite station and the terminal device 50. FIG. 3 is a diagram illustrating an outline of satellite communication provided by the communication system 1. Satellite stations are mainly divided into geostationary earth orbiting satellite stations and low earth orbiting satellite stations.

The geostationary earth orbiting satellite station is located at an altitude of approximately 35786 km and revolves the earth at the same speed as the rotation speed of the earth. In the example of FIG. 3, the base station $20_1$ constituting the space borne platform SBP2 is a geostationary earth orbiting satellite station. The geostationary earth orbiting satellite station has a relative velocity with the terminal device 50 on the ground of substantially 0, and is observed from the terminal device 50 on the ground as if stationary. The base station $20_1$ performs satellite communication with terminal devices $50_1$, $50_3$, $50_4$, and the like located on the earth.

The low earth orbiting satellite station is a satellite station that orbits at a lower altitude than that of a geostationary earth orbiting satellite station or a middle earth orbiting satellite station. The low earth orbiting satellite station is, for example, a satellite station located at an altitude of 500 km to 2000 km. In the example of FIG. 3, the base stations $20_2$, $20_3$ constituting the space borne platform SBP1 are low earth orbiting satellite stations. FIG. 3 illustrates only two of the base station $20_2$ and the base station $20_3$ as satellite stations constituting the space borne platform SBP1. However, in actual, in the satellite stations constituting the space borne platform SBP1, a low earth orbiting satellite constellation is formed by two or more (for example, several tens to several thousands) base stations 20. Unlike the geostationary earth orbiting satellite station, the low earth orbiting satellite station has a relative velocity with the terminal device 50 on the ground, and is observed as if moving from the terminal device 50 on the ground. Each of the base stations 20₂, 20₃ constitutes a cell, and performs satellite communication with terminal devices 50₁, 50₂, 50₃, and the like located on the earth.

FIG. 4 is a diagram illustrating an example of a cell configured by a satellite station. FIG. 4 illustrates a cell C2 formed by the base station 20₃ which is a low earth orbiting satellite station. The satellite station orbiting in a low orbit communicates with the terminal device 50 on the ground with a predetermined directivity on the ground. For example, angle R1 illustrated in FIG. 4 is 40°. In the case of FIG. 4, a radius D1 of the cell C2 formed by the base station 20₃ is, for example, 1000 km. The low earth orbiting satellite station moves with a constant velocity. When it becomes difficult for a low earth orbiting satellite station to provide satellite communication to the terminal device 50 on the ground, a subsequent low earth orbiting satellite station provides satellite communication. In the case of the example of FIG. 4, when it becomes difficult for the base station 20₃ to provide satellite communication to the terminal device 50 on the ground, the subsequent base station 204 provides satellite communication. The values of the angle R1 and the radius D1 described above are merely examples, and the values are not limited to the above.

As described above, the terminal device 50 can perform radio communication using a non-terrestrial network. The base station 20 and the base station 40 of the communication system 1 constitute a non-terrestrial network. As a result, the communication system 1 can extend the service to the terminal device 50 located in an area that cannot be covered by the terrestrial network. For example, the communication system 1 can provide public safety communication and critical communication to the terminal device 50 such as an Internet of Things (IoT) device or a machine type communications (MTC) device. Since the use of the non-terrestrial network improves service reliability and recoverability, the communication system 1 can reduce the vulnerability of the service to physical attacks or natural disasters. The communication system 1 can achieve service connection to aircraft terminal devices such as airplane passengers and drones, and service connection to mobile terminal devices such as ships and trains. The communication system 1 can achieve provision of A/V content, group communication, an IoT broadcast service, a software download service, a high-efficiency multicast service such as an emergency message, a high-efficiency broadcast service, and the like. The communication system 1 can also achieve traffic offloading between a terrestrial network and a non-terrestrial network. In order to achieve these, it is desirable that the non-terrestrial network provided by the communication system 1 and the terrestrial network provided by the communication system 1 are integrated in operation in a higher layer, but the present invention is not limited thereto. It is desirable that the non-terrestrial network provided by the communication system 1 and the terrestrial network provided by the communication system 1 have a common radio access system, but the present invention is not limited thereto.

Next, a configuration of each device constituting the communication system 1 according to the present embodiment will be specifically described.

<2-2. Configuration of Management Device>

The management device 10 is a device that manages a wireless network. For example, the management device 10 is a device that manages communication between the base station 20 and the base station 30. When the core network is the EPC, the management device 10 is, for example, a device having a function as a mobility management entity (MME). When the core network is the 5GC, the management device 10 is, for example, a device having a function as an access and mobility management function (AMF). The management device 10 may have a function of a gateway. For example, when the core network is the EPC, the management device 10 may have a function as a serving gateway (S-GW) or a packet data network gateway (P-GW). When the core network is the 5GC, the management device 10 may have a function as a user plane function (UPF). The management device 10 is not necessarily a device constituting the core network. For example, when the core network is a core network of W-CDMA or cdma 2000, the management device 10 may be a device that functions as a radio network controller (RNC).

Figure 5:
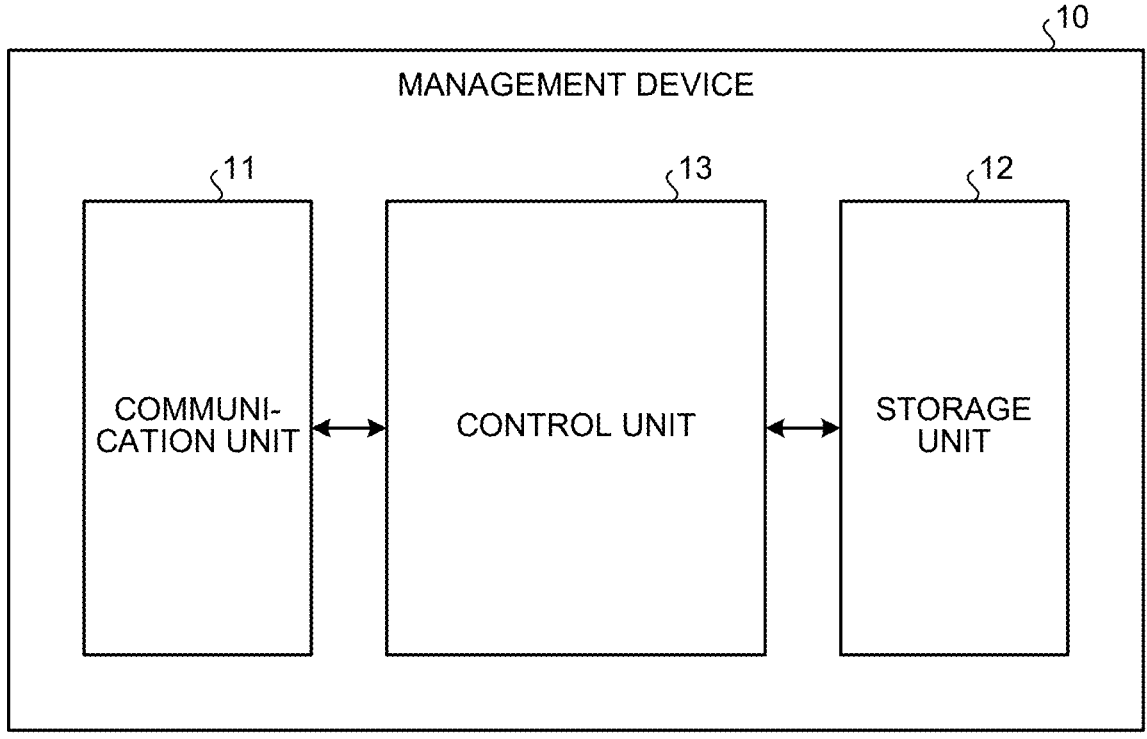
FIG. 5 is a diagram illustrating a configuration example of a management device according to an embodiment of the present disclosure.

FIG. 5 is a diagram illustrating a configuration example of the management device 10 according to an embodiment of the present disclosure. The management device 10 includes a communication unit 11, a storage unit 12, and a control unit 13. The configuration illustrated in FIG. 5 is a functional configuration, and a hardware configuration may be different from the functional configuration. The functions of the management device 10 may be implemented in a distributed manner in a plurality of physically separated configurations. For example, the management device 10 may include a plurality of server devices.

The communication unit 11 is a communication interface for communicating with other devices. The communication unit 11 may be a network interface or a device connection interface. For example, the communication unit 11 may be a local area network (LAN) interface such as a network interface card (NIC), or may be a USB interface including a universal serial bus (USB) host controller, a USB port, and the like. The communication unit 11 may be a wired interface or a wireless interface. The communication unit 11 functions as communication means of the management device 10. The communication unit 11 communicates with the base station 30 and the relay station 60 under the control of the control unit 13.

The storage unit 12 is a data readable and writable storage device such as a dynamic random access memory (DRAM), a static random access memory (SRAM), a flash memory, or a hard disk. The storage unit 12 functions as storage means of the management device 10. The storage unit 12 stores, for example, a connection state of the terminal device 50. For example, the storage unit 12 stores a radio resource control (RRC) state and an EPS connection management (ECM) state of the terminal device 50. The storage unit 12 may function as a home memory that stores position information of the terminal device 50.

The control unit 13 is a controller that controls each unit of the management device 10. The control unit 13 is achieved by, for example, a processor such as a central processing unit (CPU) or a micro processing unit (MPU). For example, the control unit 13 is achieved by the processor executing various programs stored in the storage device inside the management device 10 using a random access memory (RAM) or the like as a work area. The control unit 13 may be achieved by an integrated circuit such as an application specific integrated circuit (ASIC) or a field programmable gate array (FPGA). Any of the CPU, the MPU, the ASIC, and the FPGA can be regarded as a controller.

<2-3. Configuration of Base Station>

Next, a configuration of the base station will be described. The communication system 1 includes the base station 20, the base station 30, and the base station 40 as base stations. All of the base stations 20 to 40 may be movable. Hereinafter, the configuration of the base station 20 will be described as the configuration of the base station. The configurations of the base station 30 and the base station 40 may be the same as the configuration of the base station 20 described below.

Figure 6:
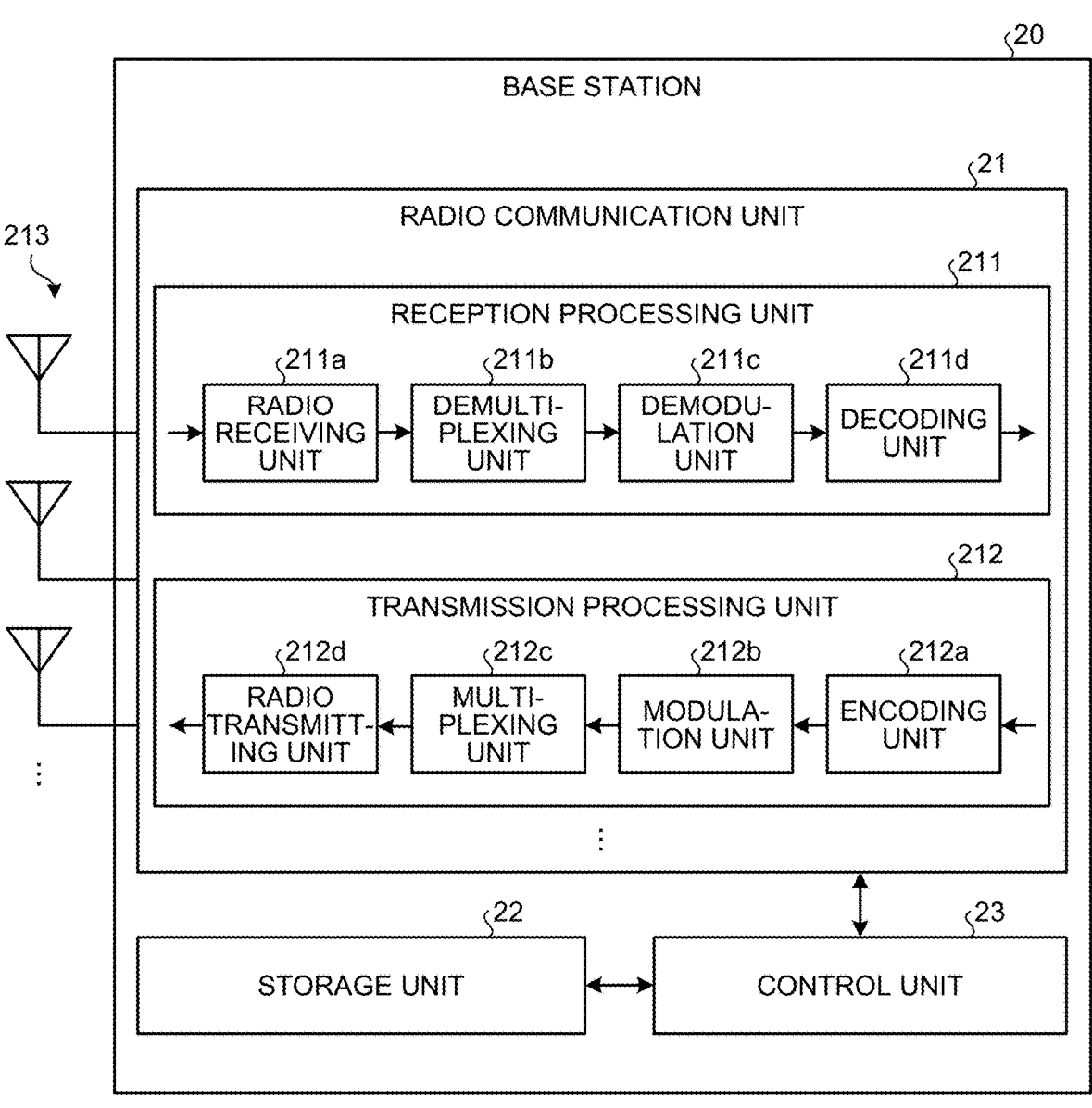
FIG. 6 is a diagram illustrating a configuration example of a non-ground station according to an embodiment of the present disclosure.

FIG. 6 is a diagram illustrating a configuration example of the base station 20 according to an embodiment of the present disclosure. The base station 20 includes a radio communication unit 21, a storage unit 22, and a control unit 23. The configuration illustrated in FIG. 6 is a functional configuration, and a hardware configuration may be different from the functional configuration. The functions of the base station 20 may be implemented in a distributed manner in a plurality of physically separated configurations.

The radio communication unit 21 is a radio communication interface that performs radio communication with other radio terminal devices (for example, the terminal device 50 or the relay station 60). The radio communication unit 21 supports one or a plurality of radio access methods. For example, the radio communication unit 21 supports both NR and LTE. The radio communication unit 21 may support W-CDMA or cdma 2000 in addition to NR or LTE. The radio communication unit 21 includes a reception processing unit 211, a transmission processing unit 212, and an antenna 213. The radio communication unit 21 may include a plurality of reception processing units 211, a plurality of transmission processing units 212, and a plurality of antennas 213. When the radio communication unit 21 supports a plurality of radio access methods, each unit of the radio communication unit 21 can be configured individually for each radio access method. For example, the reception processing unit 211 and the transmission processing unit 212 may be individually configured by LTE and NR.

The reception processing unit 211 processes an uplink signal received via the antenna 213. The reception processing unit 211 includes a radio receiving unit 211*a*, a demultiplexing unit 211*b*, a demodulation unit 211*c*, and a decoding unit 211*d*.

The radio receiving unit 211*a* performs down-conversion, removal of an unnecessary frequency component, control of an amplification level, quadrature demodulation, conversion to a digital signal, removal of a guard interval, extraction of a frequency domain signal by fast Fourier transform, and the like on the uplink signal. The demultiplexing unit 211*b* demultiplexes an uplink channel such as a physical uplink shared channel (PUSCH) or a physical uplink control channel (PUCCH) and an uplink reference signal from the signal output from the radio receiving unit 211*a*. The demodulation unit 211*c* demodulates the received signal using a modulation scheme such as binary phase shift keying (BPSK) or quadrature phase shift keying (QPSK) with respect to the modulation symbol of the uplink channel. The modulation scheme used by the demodulation unit 211*c* may be 16 quadrature amplitude modulation (QAM), 64 QAM, 256 QAM, or the like. The decoding unit 211*d* performs decoding processing on the demodulated encoded bits of the uplink channel. The decoded uplink data and uplink control information are output to the control unit 23.

The transmission processing unit 212 performs processing of transmitting downlink control information and downlink data. The transmission processing unit 212 includes an encoding unit 212*a*, a modulation unit 212*b*, a multiplexing unit 212*c*, and a radio transmitting unit 212*d*.

The encoding unit 212*a* encodes the downlink control information and the downlink data input from the control unit 23 using an encoding method such as block encoding, convolutional encoding, turbo encoding, or the like. The modulation unit 212*b* modulates the encoded bits output from the encoding unit 212*a* by a predetermined modulation scheme such as BPSK, QPSK, 16 QAM, 64 QAM, or 256 QAM. The multiplexing unit 212*c* multiplexes a modulation symbol of each channel and a downlink reference signal and arranges the multiplexed results in a predetermined resource element. The radio transmitting unit 212*d* performs various types of signal processing on the signal from the multiplexing unit 212*c*. For example, the radio transmitting unit 212*d* performs processing such as conversion into a time domain by fast Fourier transform, addition of a guard interval, generation of a baseband digital signal, conversion into an analog signal, quadrature modulation, up-conversion, removal of an extra frequency component, and power amplification. The signal generated by the transmission processing unit 212 is transmitted from the antenna 213.

The storage unit 22 is a storage device capable of reading and writing data, such as a DRAM, an SRAM, a flash memory, or a hard disk. The storage unit 22 functions as storage means of the base station 20. The storage unit 22 stores switching information. The switching information is information used by the terminal device 50 to switch the base station. The switching information includes, for example, information such as resource information, trigger information, timing advance information, and the like.

The resource information is information related to a radio resource used by the terminal device 50 in connection to perform radio communication with the base station of a switching destination candidate configured to be movable. The trigger information is information used by the terminal device 50 to determine whether to switch the connection destination base station. The timing advance information is information related to timing advance for the terminal device 50 to connect to the base station as the switching destination candidate. The resource information, the trigger information, and the timing advance information will be described in detail later.

The control unit 23 is a controller that controls each unit of the base station 20. The control unit 23 is achieved by, for example, a processor such as a central processing unit (CPU) or a micro processing unit (MPU). For example, the control unit 23 is achieved by the processor executing various programs stored in the storage device inside the base station 20 using a random access memory (RAM) or the like as a work area. The control unit 23 may be achieved by an integrated circuit such as an application specific integrated circuit (ASIC) or a field programmable gate array (FPGA). Any of the CPU, the MPU, the ASIC, and the FPGA can be regarded as a controller.

<2-5. Configuration of Terminal Device>

Figure 7:
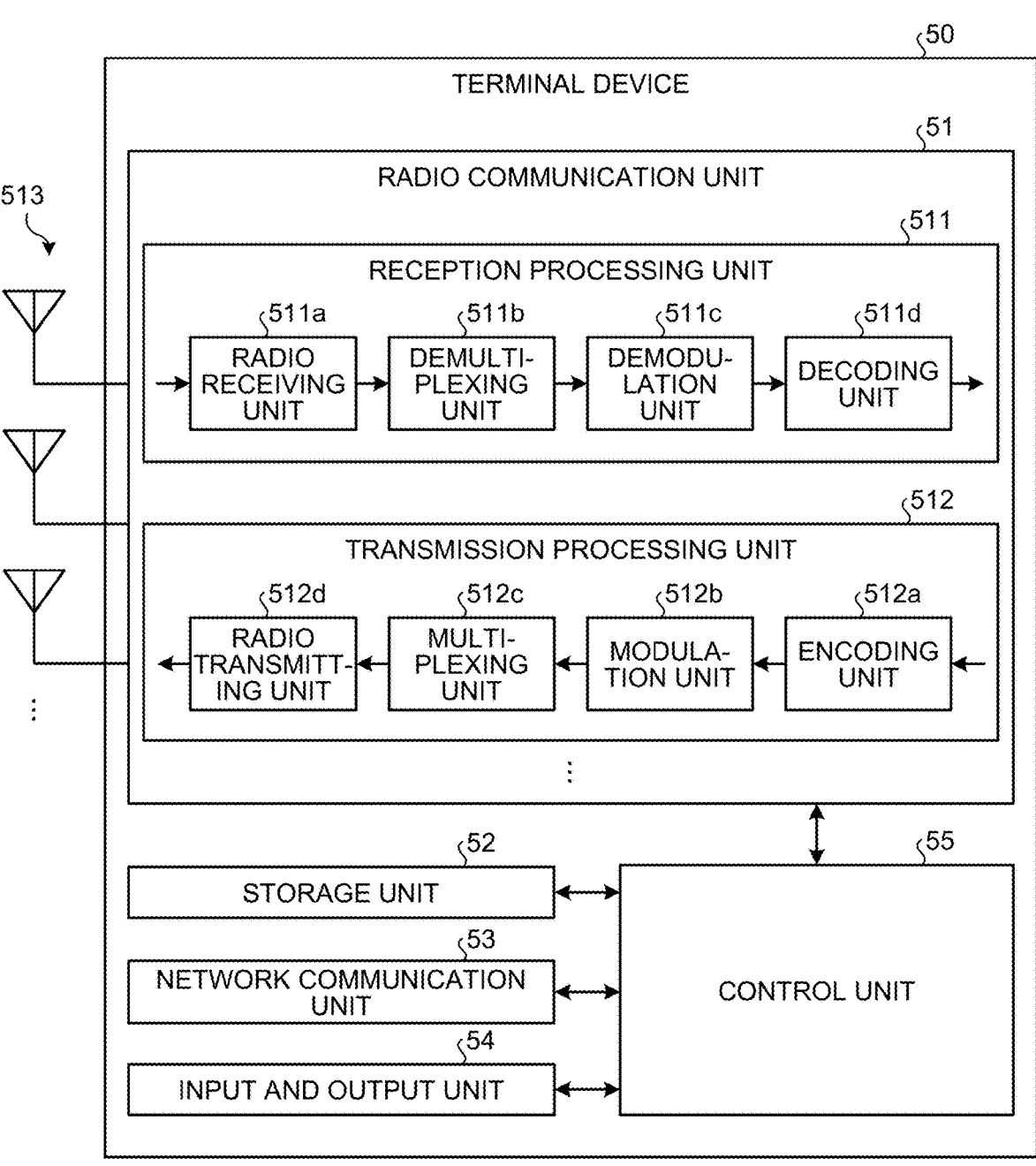
FIG. 7 is a diagram illustrating a configuration example of a terminal device according to an embodiment of the present disclosure.

Next, a configuration of the terminal device 50 will be described. FIG. 7 is a diagram illustrating a configuration example of the terminal device 50 according to an embodiment of the present disclosure. The terminal device 50 includes a radio communication unit 51, a storage unit 52, a network communication unit 53, an input and output unit 54, and a control unit 55. The configuration illustrated in FIG. 7 is a functional configuration, and a hardware configuration may be different from the functional configuration. The functions of the terminal device 50 may be implemented in a distributed manner in a plurality of physically separated configurations. The configuration illustrated in FIG. 7 is an example, and the radio communication unit 51, the storage unit 52, the network communication unit 53, the input and output unit 54, and the control unit 55 are not all essential components. For example, from the viewpoint of the embodiment of the present disclosure, at least the network communication unit 53 and the input and output unit 54 may not be essential components.

The radio communication unit 51 is a radio communication interface that performs radio communication with other radio communication devices (for example, base stations 20, 30, 40). The radio communication unit 51 supports one or a plurality of radio access methods. For example, the radio communication unit 51 supports both NR and LTE. The radio communication unit 51 may support W-CDMA or cdma 2000 in addition to NR or LTE. The radio communication unit 51 includes a reception processing unit 511, a transmission processing unit 512, and an antenna 513. The radio communication unit 51 may include a plurality of reception processing units 511, a plurality of transmission processing units 512, and a plurality of antennas 513. When the radio communication unit 51 supports a plurality of radio access methods, each unit of the radio communication unit 51 can be configured individually for each radio access method. For example, the reception processing unit 511 and the transmission processing unit 512 may be individually configured by LTE and NR.

The reception processing unit 511 processes a downlink signal received via the antenna 513. The reception processing unit 511 includes a radio receiving unit 511*a*, a demultiplexing unit 511*b*, a demodulation unit 511*c*, and a decoding unit 511*d*.

The radio receiving unit 511*a* performs down-conversion, removal of an unnecessary frequency component, control of an amplification level, quadrature demodulation, conversion to a digital signal, removal of a guard interval, extraction of a frequency domain signal by fast Fourier transform, and the like on the downlink signal. The demultiplexing unit 511*b* demultiplexes a downlink channel, a downlink synchronization signal, and a downlink reference signal from the signal output from the radio receiving unit 511*a*. The downlink channel is, for example, a channel such as a physical broadcast channel (PBCH), a physical downlink shared channel (PDSCH), or a physical downlink control channel (PDCCH). The demodulation unit 211*c* demodulates the received signal using a modulation scheme such as BPSK, QPSK, 16 QAM, 64 QAM, or 256 QAM for the modulation symbol of the downlink channel. The decoding unit 511*d* performs decoding processing on the demodulated encoded bits of the downlink channel. The decoded downlink data and downlink control information are output to the control unit 23.

The transmission processing unit 512 performs processing of transmitting uplink control information and uplink data. The transmission processing unit 512 includes an encoding unit 512*a*, a modulation unit 512*b*, a multiplexing unit 512*c*, and a radio transmitting unit 512*d*.

The encoding unit 512*a* encodes the uplink control information and the uplink data input from the control unit 55 using an encoding method such as block encoding, convolutional encoding, turbo encoding, or the like. The modulation unit 512*b* modulates the encoded bits output from the encoding unit 512*a* by a predetermined modulation scheme such as BPSK, QPSK, 16 QAM, 64 QAM, or 256 QAM. The multiplexing unit 512*c* multiplexes a modulation symbol of each channel and an uplink reference signal and arranges the multiplexed results in a predetermined resource element. The radio transmitting unit 512*d* performs various types of signal processing on the signal from the multiplexing unit 512*c*. For example, the radio transmitting unit 512*d* performs processing such as conversion into a time domain by inverse fast Fourier transform, addition of a guard interval, generation of a baseband digital signal, conversion into an analog signal, quadrature modulation, up-conversion, removal of an extra frequency component, and power amplification. The signal generated by the transmission processing unit 512 is transmitted from the antenna 513.

The storage unit 52 is a storage device capable of reading and writing data, such as a DRAM, an SRAM, a flash memory, or a hard disk. The storage unit 52 functions as storage means of the terminal device 50. The storage unit 52 stores switching information. The switching information is information acquired from the base station 20, 30, or 40, and is used by the terminal device 50 to switch the base station. The switching information includes, for example, information such as resource information, trigger information, timing advance information, and the like. The resource information, the trigger information, and the timing advance information will be described in detail later.

The network communication unit 53 is a communication interface for communicating with other devices. For example, the network communication unit 53 is a LAN interface such as an NIC. The network communication unit 53 may be a wired interface or a wireless interface. The network communication unit 53 functions as network communication means of the terminal device 50. The network communication unit 53 communicates with other devices under the control of the control unit 55.

The input and output unit 54 is a user interface for exchanging information with the user. For example, the input and output unit 54 is an operation device for the user to perform various operations, such as a keyboard, a mouse, an operation key, and a touch panel. Alternatively, the input and output unit 54 is a display device such as a liquid crystal display or an organic electroluminescence display. The input and output unit 54 may be an acoustic device such as a speaker or a buzzer. The input and output unit 54 may be a lighting device such as a light emitting diode (LED) lamp. The input and output unit 54 functions as input and output means (input means, output means, operation means, or notification means) of the terminal device 50.

The control unit 55 is a controller that controls each unit of the terminal device 50. The control unit 55 is achieved by, for example, a processor such as a CPU or an MPU. For example, the control unit 55 is achieved by the processor executing various programs stored in the storage device inside the terminal device 50 using a RAM or the like as a work area. The control unit 55 may be achieved by an integrated circuit such as an ASIC or an FPGA. Any of the CPU, the MPU, the ASIC, and the FPGA can be regarded as a controller.

<2-6. Initial Access Processing>

Next, operation of the communication system 1 will be described. First, initial access processing will be described. The initial access is processing for transitioning from an idle state (RRC_IDLE) in which the UE (terminal device 50) has not established a connection with any of the RAN (base station), the base station 20 and the base station 30 to a connection state (RRC_CONNECTED) in which a connection with any of the RANs has been established.

FIG. 8 is a flowchart illustrating an example of the initial access processing. The initial access processing will be described below with reference to FIG. 8. The initial access processing described below is executed, for example, in a case where power is applied to the UE (terminal device 50).

First, the terminal device 50 in the idle state performs cell search. Cell search is a procedure for UEs to detect the Physical Cell ID (PCI) of a cell and obtain time and frequency synchronization. The cell search of the present embodiment includes process of detecting a synchronization signal and decoding a PBCH. The synchronization signal (SS) in NR includes a primary synchronization signal (PSS) and a secondary synchronization signal (SSS). In the NR, the PSS, the SSS, and the PBCH are transmitted as one set. This set is referred to as an SS/PBCH block (SSB). A plurality of SSBs is transmitted per unit time (e g., half frame (5 ms)). The plurality of SSBs transmitted per half frame is referred to as SSB burst, SS burst, SSB burst set, or SS burst set. The SSB burst is periodically and repeatedly transmitted with the periodicity of the SSB burst. Each of a plurality of SSBs in one SSB burst is assigned an index (SSB Index). One SSB Index is associated with, for example, one beam. The number of plurality of SSBs in one SSB burst depends on the subcarrier spacing associated with the frequency band. The control unit 55 of the UE (terminal device 50) detects the SSB of the cell (step S101). More specifically, the UE detects the SSB corresponding to the best quality beam from the SSB bursts. The control unit 55 performs synchronization in the downlink with the cell on the basis of the detected synchronization signal. After the downlink synchronization is established, the control unit 55 attempts to decode the PBCH and acquires a master information block (MIB) that is part of the system information (step S102).

The system information is information for reporting a configuration in a cell to which the system information is transmitted. The system information includes, for example, information (e.g., RACH-Config) regarding access to a cell (e.g., Random Access), information regarding cell selection, information regarding other RATs and other systems, and the like. The system information includes an MIB and a system information block (SIB). The MIB is physical layer information necessary for receiving the SIB and the like, and is fixed payload size information informed by the PBCH. The MIB includes downlink system bandwidth, a part of a system frame number, SIB scheduling information, and the like. The SIB is system information other than the MIB and is informed by the PDSCH.

The system information can be classified into first system information, second system information, and third system information. The first system information and the second system information include information on access to a cell, information on acquisition of other system information, and information on cell selection. In LTE, information included in the MIB is the first system information. Information included in a SIB 1 and a SIB 2 in the SIBs is the second system information. The remaining system information is the third system information.

Also in NR, system information is informed from the NR cell. The physical channel carrying the system information may be transmitted in a slot or a mini-slot. The mini-slot is defined by the number of symbols smaller than the number of symbols of the slot. Since the physical channel carrying the system information is transmitted in the mini-slot, the time required for the beam sweep is shortened, and the overhead can be reduced. For NR, the first system information is transmitted on the NR-PBCH, and the second system information is transmitted on a physical channel different from the NR-PBCH.

The control unit 55 of the terminal device 50 acquires the second system information on the basis of the MIB (that is, the first system information) (step S103). As described above, the second system information includes the SIB 1 and the SIB 2. The SIB 1 is scheduling information of access control information of a cell and system information other than the SIB 1. In the case of NR, the SIB 1 includes information related to cell selection (for example, cellSelectionInfo), information related to cell access (for example, cellAccessRelatedInfo), information related to connection establishment failure control (for example, connEstFailureControl), scheduling information of system information other than the SIB 1 (for example, si-SchedulingInfo), a configuration of a serving cell, and the like. The configuration of the serving cell includes a cell-specific parameter, and includes a downlink configuration, an uplink configuration, TDD configuration information, and the like. The uplink configuration includes a RACH configuration and the like. In the case of LTE, the SIB 1 includes access information of a cell, cell selection information, maximum uplink transmission power information, TDD configuration information, a period of system information, mapping information of system information, a length of a system information (SI) window, and the like. In the case of NR, the SIB 2 includes cell reselection information (for example, cellReselectionInfoCommon) and cell reselection serving frequency information (for example, crelReselectionServingFreqInfo). In the case of LTE, the SIB 2 includes connection prohibition information, radio resource configuration information (radioResourceConfigCommon) common to cells, uplink carrier information, and the like. The radio resource configuration information common to cells includes configuration information of a physical random access channel (PRACH) and a random access channel (RACH) common to cells.

In a case where the control unit 55 has not been able to acquire the system information necessary for establishing the link, the control unit 55 of the terminal device 50 determines that access to the cell is prohibited. For example, in a case where all of the first system information and the second system information cannot be acquired, the control unit 55 determines that access to the cell is prohibited. In this case, the control unit 55 ends the initial access processing.

In a case where the system information can be acquired, the control unit 55 executes a random access procedure on the basis of the first system information and/or the second system information (step S104). The random access procedure may be referred to as a random access channel procedure (RACH procedure) or an RA procedure. In the RACH procedure, the UE first transmits a Random Access Preamble, and then monitors the PDCCH of the cell for Random Access Response identified by the RA-RNTI for a period of time indicated by the configured IE ra-ResponseWindow. On the other hand, when the transmitted preamble reaches the RAN without collision, a Random Access Response including a preamble identifier corresponding to PREAMBLE_INDEX which is an index of the transmitted preamble is transmitted from the RAN to the UE. When the UE receives a Random Access Response including a Preamble identifier corresponding to the transmitted PREAMBLE_INDEX while ra-ResponseWindow is running, the UE recognizes that the random access procedure is successfully completed. Then, when the UE transmits the RRCSetupRequest message by the Msg3 and receives the RRCSetup message from the RAN in response to the RRCSetupRequest message, the UE (terminal device 50) transitions from the idle state (RRC_IDLE) to the connected state (RRC- _CONNECTED) (enters RRC Connected), and recognizes the current cell (cell on which the RACH procedure has been performed and the RRC Setup procedure has been performed) as the Primary Cell.

<2-7. Example of HARQ Procedure>

Here, in communication processing (for example, the above-described initial access processing) by the control unit 55 of the terminal device 50 and a control unit (for example, the control unit 23) of a base station device (for example, the base station 20, the base station 30), Hybrid ARQ (HARQ) is used for data error correction. For example, the HARQ is used for PDSCH data transmission, PUSCH data transmission, and PSSCH data transmission.

The HARQ is means for obtaining an encoding gain by performing error correction by soft combining the first transmission data and the retransmitted data. In order to perform the HARQ, the base station device or the terminal device 50 holds data that has failed to be decoded in the HARQ buffer, combines the retransmitted data and the held data, and performs error correction. More specifically, one HARQ process may include the following operation. The MAC entity in the UE (terminal device 50) determines whether the received data is new transmission or retransmission from a New Date Indicator (NDI) in the DCI in which a transmission resource of the data is scheduled. In a case where the received data is new transmission, the MAC entity attempts to decode the received data. If the received data is retransmission and the data of that transport block has not yet been successfully decoded, the MAC entity instructs the physical layer to combine the data currently in the soft buffer for this transport block with the received data and attempts to decode the combined data. If the data attempted to be decoded by the MAC entity has been decoded successfully, or if the data has previously been decoded successfully, the decoded MAC PDU is carried to a higher layer or a disassembly and demultiplexing entity. If the data attempted to be decoded by the MAC entity has not been decoded successfully, and if the data has not been decoded successfully before, the physical layer is instructed to replace the data in the soft buffer for that transport block with the data attempted to be decoded. Then, the MAC entity instructs the physical layer to generate acknowledgement(s), that is, HARQ feedback (ACK/NACK) of the data in the transport block.

The HARQ processing is performed for each HARQ process to which identification information (for example, HARQ process identifier) is assigned. That is, in a case where there is a plurality of HARQ processes, it is possible to perform HARQ processing in parallel. The base station device or the terminal device 50 can hold one or a plurality of HARQ processes. More specifically, the MAC entity includes a HARQ entity for each serving cell. The HARQ entity maintains a large number of parallel HARQ processes. The HARQ processing can be applied not only to the downlink but also to the uplink. In this case, the MAC entity includes a HARQ entity for each serving cell for which an uplink is configured. As described above, each HARQ process is associated with a HARQ process identifier. The number of HARQ processes for the downlink and the number of HARQ processes for the uplink may be different or the same. The HARQ entity forwards, for example, the HARQ information and the associated TB to the corresponding HARQ process.

The base station device in the description below can be implemented regardless of whether or not it is the base station 20 or the base station 30 that operates as a communication device, such as a satellite station, a drone, a balloon, or an airplane. The base station 30 and the terminal device, in the description below, when a specific example is shown, there is a portion where a specific value is shown and described, but the value does not depend on the example, and another value may be used.

In the description below, a resource represents a frequency, a time, a resource element (including REG, CCE, CORESET), a resource block, a bandwidth part, a component carrier, a symbol, a sub-symbol, a slot, a mini-slot, a subslot, a subframe, a frame, a PRACH occasion, an occasion, a code, a multi-access physical resource, a multi-access signature, a subcarrier spacing (numerology), or the like. The HARQ process identifier in the description below may be replaced with a HARQ process number.

Here, the HARQ procedure will be described by exemplifying PDSCH data transmission from the base station device (for example, the base station 20, 30) to the terminal device 50. FIG. 9 is a sequence diagram illustrating an example of a HARQ procedure.

As illustrated in FIG. 9, the control unit (for example, the control unit 23) of the base station device (for example, the base station 20, the base station 30) transmits the PDSCH data to the terminal device 50 by using the HARQ via radio communication (for example, the radio communication unit 21) (step S201). That is, the UE (terminal device 50) receives the PDSCH data. More specifically, the UE monitors the PDCCH in a period determined on the basis of a configuration related to PDCCH monitoring, such as discontinuous reception (DRX), BWP, or SCell configuration. Here, when there is data addressed to the UE (i.e., when PDCCH indicates allocation of data (PDSCH) addressed to the UE), the UE receives the data on the corresponding PDSCH. Then, the UE starts drx-HARQ-RTT-TimerDL for the HARQ process associated with the data (the transport block carried on the PDSCH) with the PDCCH indicating the PDSCH data (DL transmission) as a trigger. The timing to start drx-HARQ-RTT-TimerDL is the first OFDM symbol after the last OFDM symbol of the corresponding transmission that carries the DL HARQ feedback. It is assumed that HARQ process #1 is assigned as the HARQ process identifier to the HARQ processing of the PDSCH data transmission.

The control unit 55 (e.g., MAC entity) of the terminal device 50 that has received the PDSCH data from the base station device attempts to decode the PDSCH data (i.e., data in the transport block carried by the PDSCH). As described above, when the received data is newly transmitted, the decoding is newly attempted, and when the received data is retransmitted, the decoding is attempted after the data already stored in the soft buffer and the received data are combined. Here, it is assumed that the PDSCH data has not been successfully decoded (step S202).

Due to the decoding failure of the PDSCH data, the control unit 55 (e.g., MAC entity) of the terminal device 50 stores the PDSCH data of which decoding has failed in the HARQ buffer of the HARQ process #1 in the storage region secured in the storage unit 52 (step S204). In a case where data is already stored in the HARQ buffer, the data is replaced. Next, the NACK is transmitted to the base station device via the radio communication unit 51 (step S203). If the drx-HARQ-RTT-TimerDL that has been operated expires, when the data of the HARQ process is not successfully decoded, the terminal device causes the UE to start drx-RetransmissionTimerDL. The timing to start drx-RetransmissionTimerDL is the first OFDM symbol after the expiration of drx-HARQ-RTT-TimerDL. In the case of FIG.

9, since the decoding of the data corresponding to HARQ process #1 has failed in step S202, drx-RetransmissionTimerDL starts.

Figure 10:
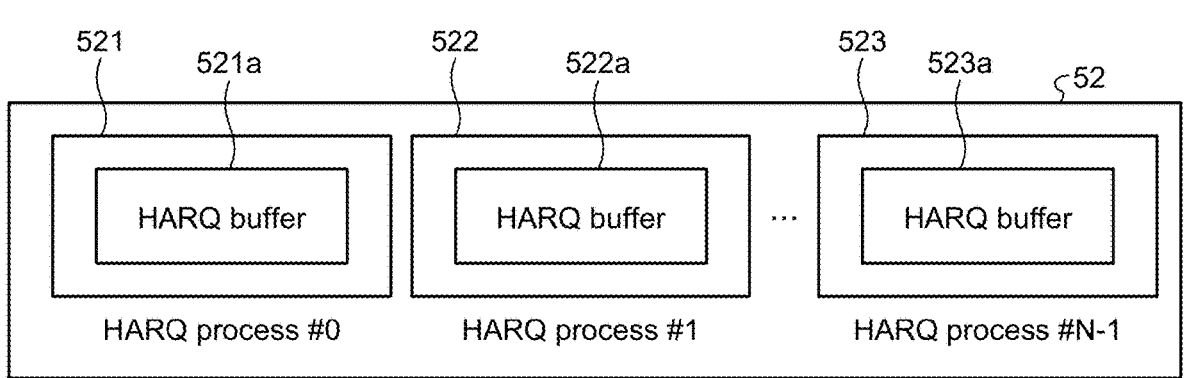
FIG. 10 is an explanatory diagram for describing an outline of a HARQ buffer.

FIG. 10 is an explanatory diagram illustrating an outline of the HARQ buffer. As illustrated in FIG. 10, a storage region 521 for each HARQ process is assigned to the storage unit 52. As a result, the terminal device 50 can hold one or a plurality of HARQ processes. As similar to the terminal device 50, the base station device (for example, the base station 20, the base station 30) can also hold one or a plurality of HARQ processes in the storage unit (for example, the storage unit 22).

In the illustrated example, the control unit 55 stores the PDSCH data in a HARQ buffer 522a in a storage region 522 of the HARQ process #1 related to the PDSCH data that has not been successfully decoded. In a case where data is already stored in the HARQ buffer, the data is replaced.

Referring back to FIG. 9, the control unit (for example, the control unit 23) of the base station device (for example, the base station 20, the base station 30) that has received the NACK retransmits the PDSCH data to the terminal device 50 via radio communication (for example, the radio communication unit 21) (step S205). In other words, the UE (terminal device 50) receives retransmission of the PDSCH data. More specifically, the UE monitors the PDCCH while the drx-RetransmissionTimerDL is running. The drx-RetransmissionTimerDL indicates the time at which DL retransmission from the RAN is expected by the UE. Thus, DL retransmission is performed to the UE while drx-RetransmissionTimerDL is running.

The control unit 55 of the terminal device 50 that has received the retransmission of the PDSCH data performs soft combining of the data stored in the HARQ buffer 522a of the HARQ process #1 and the retransmission data to decode the PDSCH data (step S206). Here, it is assumed that the PDSCH data is successfully decoded (step S207).

Due to the successful decoding of the PDSCH data, the control unit 55 of the terminal device 50 transmits the ACK to the base station device via the radio communication unit 51 (step S208). Next, the control unit 55 of the terminal device 50 clears the data in the HARQ buffer 522a of the HARQ process #1 (step S209).

<2-8. Transmission Delay Problem>

For example, in the case of NTN communication, since a propagation distance between the terminal device 50 and a base station device (for example, the base station 20, the base station 30) including an airplane, a drone, and the like is long, a propagation delay increases.

When the propagation delay is large, there is no free HARQ buffer in the base station device or the terminal device 50, and the number of HARQ processes may be insufficient. For example, when the base station device transmits data and the terminal device 50 receives the data, if the decoding is successful, the terminal device 50 returns the ACK to the base station device and flushes (clears) the data in the HARQ buffer, and the process ends. On the other hand, when the decoding fails, the terminal device 50 returns the NACK to the base station device, and it is necessary to hold the received data in the HARQ buffer in order to perform soft combining with the data retransmitted after the NACK is returned.

The base station device and the terminal device 50 can use one or a plurality of HARQ processes in parallel, and in a case where the propagation delay is small, the time from when the NACK is returned to when the retransmission data is transmitted is short, and there is no problem that the HARQ process is insufficient. However, in a case where the propagation delay is large, the time until the NACK is returned and retransmission is performed becomes long, and thus, there is a possibility that the HARQ process becomes insufficient (or it takes time to resolve the insufficient state).

<2-9. Outline of Embodiments>

In view of the above transmission delay problem, in the base station device and the terminal device 50 according to the present embodiment, under the control of the control unit (for example, the control unit 23, 55), disabling information for disabling feedback for retransmission in the HARQ is notified via the radio communication unit (for example, the radio communication units 21, 51) (HARQ feedback disabling). As described above, by disabling feedback for retransmission (HARQ feedback disabling), the data in the buffer is immediately flushed (cleared) without storing the received data in the HARQ buffer, and the HARQ process is prevented from becoming insufficient.

That is, the HARQ feedback disabling is to complete data transmission only by first transmission or by repeatedly transmitting single or a plurality of spatially multiplexed transport blocks without ACK/NACK notification from the terminal device 50. At this time, ACK/NACK return of the terminal device 50 may not be performed.

For example, in a case where the downlink is considered, the HARQ feedback for the PDSCH transmission corresponds to uplink control information (UCI) transmitted from the terminal device 50. As an example, when the decoding of the PDSCH transmitted from the base station device (for example, the base station 20, the base station 30) fails, the control unit 55 of the terminal device 50 transmits the UCI (NACK) to the base station device via the radio communication unit 51. As a result, the control unit (for example, the control unit 23) of the base station device retransmits the data via the radio communication unit (for example, the radio communication unit 21). On the other hand, when the PDSCH transmitted from the base station device is successfully decoded, the control unit 55 of the terminal device 50 transmits the UCI (ACK) to the base station device via the radio communication unit 51, and the base station device transmits next new data.

In a case where the uplink is considered, the HARQ feedback for the PUSCH transmission corresponds to, for example, downlink control information (DCI) transmitted from the base station device, or corresponds to explicit ACK/NACK information. For example, when the PUSCH transmitted from the terminal device 50 has not been successfully decoded, the control unit (for example, the control unit 23) of the base station device transmits DCI including information indicating retransmission to the terminal device 50 via the radio communication unit (for example, the radio communication unit 21). As a result, the control unit 55 of the terminal device 50 retransmits the data. On the other hand, when the PUSCH transmitted from the terminal device 50 is successfully decoded, the control unit (for example, the control unit 23) of the base station device transmits DCI including information indicating the first transmission to the terminal device 50 via the radio communication unit (for example, the radio communication unit 21). As a result, the control unit 55 of the terminal device 50 transmits the next new data.

In a case where the sidelink is considered, the HARQ feedback for PSSCH transmission corresponds to sidelink control information (SCI) or ACK/NACK information transmitted from the terminal device 50. For example, when decoding of the PSSCH transmitted from the terminal device $50_1$ fails, the control unit 55 of the terminal device $50_2$ transmits the SCI including the information indicating retransmission to the terminal device $50_1$ via the radio communication unit 51. As a result, the control unit 55 of the terminal device $50_1$ retransmits the data via the radio communication unit 51. On the other hand, when the PSSCH transmitted from the terminal device $50_1$ is successfully decoded, the control unit 55 of the terminal device $50_2$ transmits the SCI including the information indicating the first transmission to the terminal device $50_1$ via the radio communication unit 51. As a result, the control unit 55 of the terminal device $50_1$ transmits the next new data via the radio communication unit 51.

For example, when the PSSCH transmitted from the terminal device $50_1$ has not been successfully decoded, the control unit 55 of the terminal device $50_2$ transmits the NACK to the terminal device $50_1$ via the radio communication unit 51. As a result, the control unit 55 of the terminal device $50_1$ retransmits the data via the radio communication unit 51. On the other hand, when the PSSCH transmitted from the terminal device $50_1$ is successfully decoded, the control unit 55 of the terminal device $50_2$ transmits the ACK to the terminal device $50_1$ via the radio communication unit 51. As a result, the control unit 55 of the terminal device $50_1$ transmits the next new data via the radio communication unit 51.

As described above, the HARQ feedback corresponds to information such as the UCI, DCI, SCI, and ACK/NACK information. In a case where the HARQ feedback disabling is performed, the base station device (for example, the base station 20, the base station 30) and the terminal device 50 can transmit and receive next new data without waiting for transmission and reception of the UCI, DCI, SCI, ACK/NACK information, and the like. At this time, the HARQ buffers of the base station device (for example, the base station 20, the base station 30) and the terminal device 50 do not need to hold transmission and reception data. The HARQ feedback disabling/enabling can be applied to any of the downlink, the uplink, and the sidelink, and is not limited to any of them.

In the present embodiment, the configuration in which the HARQ feedback disabling is performed for each HARQ process is exemplified, but the unit in which the HARQ feedback disabling is performed may be appropriately set. For example, in addition to each HARQ process, the HARQ feedback disabling may be performed for each cell, each beam, each component carrier, each bandwidth part (BWP), or each user equipment (UE). Specifically, by replacing the HARQ process exemplified in the present embodiment with a cell, a sector, a beam, a component carrier, a BWP, or a UE, the unit of performing HARQ feedback disabling can be appropriately changed.

For example, in units of a cell or sector, enable and disable of the HARQ feedback may be switched for each serving cell (that is, for each HARQ entity). In other words, enable and disable of the HARQ feedback may be switched in a common configuration or timing for a plurality of terminals in the cell. In units of beams (that is, the SSB or the CSI-RS), enable and disable of the HARQ feedback may be switched for each transmission beam or each reception beam. In units of component carriers, enable and disable of the HARQ feedback may be switched for each component carrier. In units of bandwidth part (BWP), enable/disable of the HARQ feedback may be switched for each BWP. In units of UE, enable and disable of the HARQ feedback may be switched for each terminal. In units of HARQ processes, enable and disable of the HARQ feedback may be switched for each HARQ process (that is, for each TB). In units of packets, enable and disable of the HARQ feedback may be switched for each transmission packet. The above units may be switched in combination.

Here, a specific example of the HARQ feedback disabling processing in units of HARQ processes will be described for each of the downlink and uplink.

<2-10. Example of HARQ Disabling Processing (Downlink)>

Figure 11:
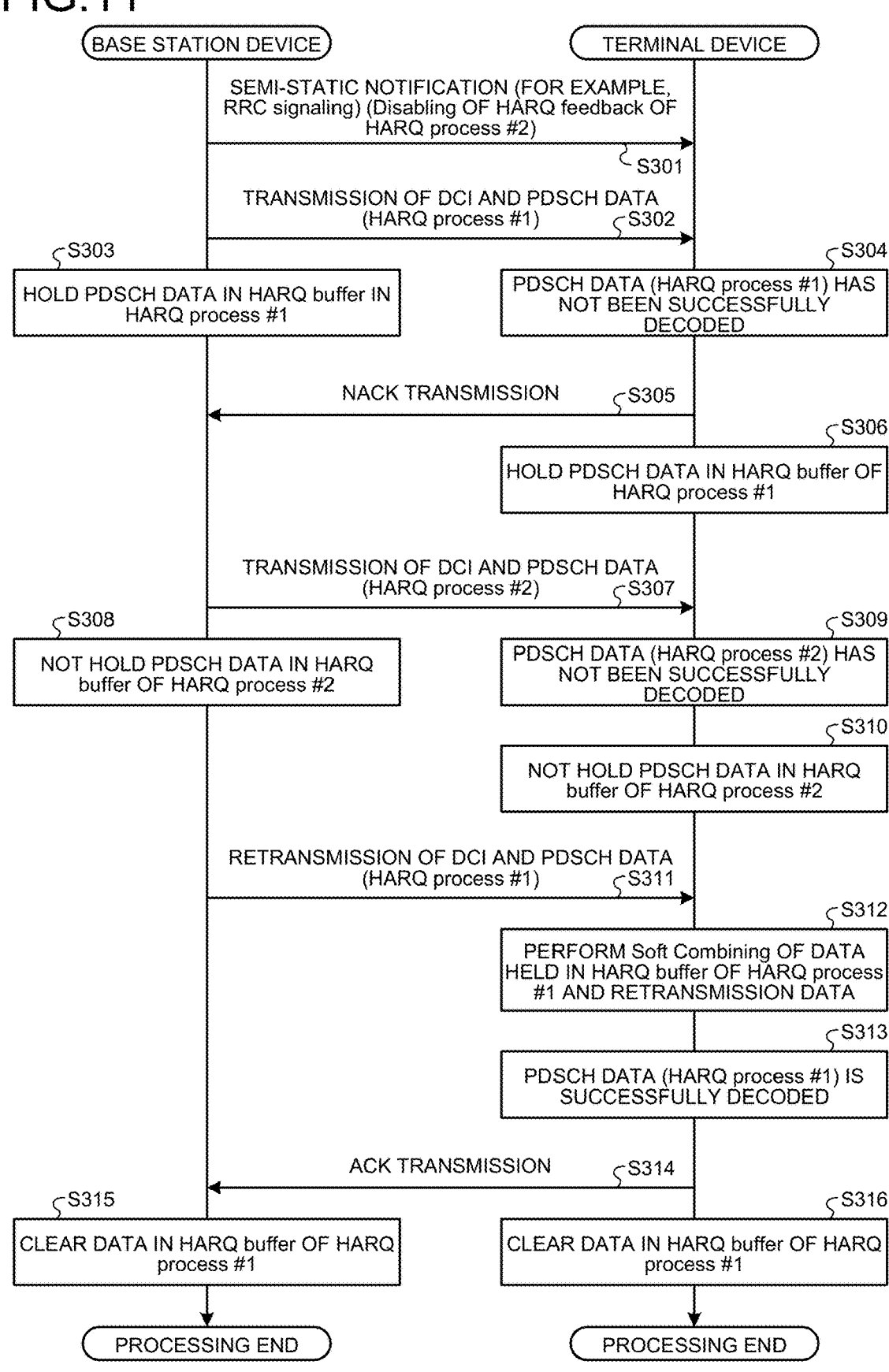
FIG. 11 is a sequence diagram illustrating an example of HARQ disabling processing according to an embodiment of the present disclosure.

FIG. 11 is a sequence diagram illustrating an example of HARQ disabling processing according to an embodiment of the present disclosure. Specifically, FIG. 11 illustrates HARQ feedback disabling in units of HARQ processes in the downlink as an example. In the case of FIG. 11, the HARQ process #1 is set to HARQ feedback enable, and the HARQ process #2 is set to HARQ feedback disable.

As illustrated in FIG. 11, first, the control unit (for example, the control unit 23) of the base station device (for example, the base station 20, the base station 30) notifies the UE (terminal device 50) to disable a predetermined HARQ process via radio communication (for example, the radio communication unit 21) as a trigger for performing the HARQ feedback disabling (step S301).

Specifically, in step S301, the base station device performs notification to disable the HARQ feedback of the HARQ process #2. The notification includes, for example, a semi-static notification (for example, radio resource control (e.g., RRC reconfiguration message, RRC setup message, RRC resume message) signaling or the like) and a dynamic notification (e.g., DCI). The control unit (for example, the control unit 23) of the base station device (for example, the base station 20, the base station 30) may perform any of the above notification methods. In a case where the UE (terminal device 50) performs the dual connectivity with a plurality of base stations, the semi-static notification may be received from the MN via the SRBs 0, 1, 2, or may be directly received from the SN via the SRB 3. The dynamic notification may be directly received from each of the MN and the SN. For example, in the case of an ENDC, a semi-static notification generated by the SN may be transmitted to the MN via an X2 interface and provided by the MN to the UE in RRC signaling. In the case of an ENDC, the dynamic notification may be provided to the UE independently of each of the PHY layer hosted by the MN and the PHY layer hosted by the SN. Either the semi-static notification or the dynamic notification may be performed, or may be performed in combination. The semi-static notification may be transmitted to the UE in notice information (e.g., MIB, SIB).

The semi-static notification includes a method of explicitly notifying HARQ disabling and a method of implicitly notifying HARQ disabling. In the explicit notification, for example, HARQ disabling is notified by system information/RRC signaling.

In the implicit notification, the terminal device 50 makes a notification to determine whether to disable the HARQ feedback on the basis of system information or another information notified by RRC signaling. For example, in the implicit notification, the terminal device 50 may determine (consider) disabling with the following information in system information or the like.

Position information of base station device and terminal device 50

Propagation distance and propagation delay information between base station device and terminal device 50

Altitude of base station device and terminal device 50

Moving speed of base station device and terminal device 50

Timing advance information

Power control information

For example, in a case where the timing advance is larger than a predetermined value, the control unit 55 of the terminal device 50 disables the HARQ feedback. In a case where the timing advance is smaller than a predetermined value, the control unit 55 of the terminal device 50 enables the HARQ feedback.

The control unit 55 of the terminal device 50 may determine whether to disable the HARQ feedback on the basis of information regarding power control. For example, in a case where the power control is larger than a predetermined value, the control unit 55 of the terminal device 50 disables the HARQ feedback. In a case where the power control is smaller than a predetermined value, the control unit 55 of the terminal device 50 enables the HARQ feedback.

In the dynamic notification, for example, when it is determined that the HARQ process has run out or may run out, the HARQ feedback of all or some HARQ processes is disabled (dynamic HARQ disabling is introduced).

The dynamic notification includes a method of explicitly notifying HARQ disabling and a method of implicitly notifying HARQ disabling.

Examples of the explicit method include the methods below.

Notification by adding the HARQ disabling field to the DCI

Notification the HARQ disabling request by the UCI

Here, the HARQ disabling request is notification information for the terminal device 50 to request the base station device for HARQ disabling. The base station device that has received the HARQ disabling request may perform the HARQ disabling on the basis of the notified information.

Notification of the transport block in which HARQ feedback should not be stopped and the transport block in which HARQ feedback may be stopped.

Examples of the implicit method include the methods below.

Notification with other physical information of PDCCH (CORESET, search space, scrambling (DMRS, RNTI))

Notification by reference signal sequence/port

Switching by DMRS sequence initialization

Switching by antenna port

In a case where the HARQ disabling is dynamically performed, the control unit (for example, the control unit 23) of the base station device or the control unit 55 of the terminal device 50 may perform operation of dynamically enabling the disabled HARQ feedback. The timing at which the UE is disabled/enabled may be specified in a standard, or may be notified from the RAN to the UE.

For example, the operation of dynamically disabling/ enabling the HARQ feedback may be applied under the following conditions (a-1, a-2, b-1, b-2).

(a-1) The operation is applied from the subframe n (or slot n) in which the DCI including indication of disabling/ enabling has been received.

(a-2) The operation is applied from the n+k subframe counting from the subframe n in which the DCI including indication of disabling/enabling has been received (or counting from slot n) (e.g., k=4)

(b-1) The operation is applied from the process indicated by the HARQ process number indicated by the DCI including indication of disabling/enabling (b-2) The operation is applied from the process next to the process indicated by the HARQ process number indicated by the DCI including indication of disabling/enabling At least one of (a-1) to (b-2) described above may be notified from the base station to the UE by semi-static notification or dynamic notification. The value of k in (a-2) described above may also be notified from the base station to the UE by semi-static notification or dynamic notification.

A control unit (for example, the control unit 23) of the base station device (for example, the base station 20, the base station 30) may select a target for which HARQ feedback disabling is performed.

For example, in a case where the HARQ feedback is disabled in units of a cell, a sector, and a beam, a control unit (for example, the control unit 23) of a base station device (for example, the base station 20, the base station 30) sets the terminal device 50 belonging to the cell, the sector, and the beam for which the HARQ feedback disabling is performed as a target of the HARQ feedback disabling. Then, the control unit (for example, the control unit 23) notifies the target terminal device 50 of the disabling of the HARQ feedback. If the target of the HARQ feedback disabling is all terminal devices in a cell (i.e., if the HARQ feedback disabling is set in cell specific), the notification may be performed by using system information. In a case where the target of the HARQ feedback disabling is dedicated to a specific terminal device (i.e., if HARQ feedback disabling is configured in UE specific), the notification may be performed using dedicated RRC signaling (e.g., RRCReconfiguration message, RRCSetup message, RRCResume message). In the dedicated RRC signaling, the HARQ feedback disabling may include one or a plurality of configurations in units of serving cell and units of beam (e.g., SSB, CSI-RS).

In a case of disabling the HARQ feedback in units of component carriers and BWPs, the control unit (for example, the control unit 23) of the base station device (for example, the base station 20, the base station 30) sets the component carrier that performs the HARQ feedback disabling and the terminal device 50 that performs communication in the BWP as targets of the HARQ feedback disabling. Then, the control unit (for example, the control unit 23) notifies the target terminal device 50 of the disabling of the HARQ feedback by RRC signaling or DCI.

In a case where the HARQ feedback is disabled in units of a UE, a control unit (for example, the control unit 23) of a base station device (for example, the base station 20, the base station 30) sets the UE that performs HARQ feedback disabling as a target of the HARQ feedback disabling. Then, the control unit (for example, the control unit 23) notifies the target terminal device 50 of the UE of the disabling of the HARQ feedback by RRC signaling or DCI.

In a case where the HARQ feedback is disabled in units of a HARQ process, a control unit (for example, the control unit 23) of a base station device (for example, the base station 20, the base station 30) disables the HARQ feedback in the HARQ process of performing the HARQ feedback disabling.

For example, it is assumed that the number of HARQ processes is X in total (here, the HARQ process is described as an example, but the HARQ process may be replaced with a cell, a sector, a beam, a component carrier, a BWP, or a UE).

First, the HARQ feedback in the (X-A) HARQ processes is left enabled, and the HARQ feedback in the A HARQ processes is disabled. Here, the value of A is notified explicitly or implicitly.

For example, the explicit notification of the value of A may be any of the following.

Notification by system information block (SIB)

Notification by RRC signaling

Notification by DCI

Further, the implicit notification of the value of A may be any of the following.

Notification with other physical information of PDCCH (CORESET, search space, scrambling (DMRS, RNTI))

Notification by reference signal sequence/port

Notification by Type of the base station

Note that, in the case of notification by Type of the base station, for example, A=X when the base station is GEO, A=Y (Y<=X) when the base station is MEO, and A=Z (Z<=Y) when the base station is LEO.

Instead of the number, the HARQ process number to be disabled may be explicitly notified. For example, in the notification of the HARQ process number to be disabled, the HARQ process IDs=14, 15 may be disabled.

In addition to X HARQ processes, B HARQ processes for disabling may be added. Since it is considered that it is not necessary to hold data in the HARQ buffer in the disabled HARQ process, it is possible to add a HARQ process for disabling in addition to the existing HARQ process. The number B to be added may be one or plural.

In the above description, description is made for the HARQ process for disabling. However, since retransmission processing is not performed, the process may not be included in one of the HARQ processes. That is, the process may be treated as a process for disabling and as a different process from the HARQ process.

In a case where the HARQ feedback is set to be disabled, as an exception, the HARQ feedback may not be disabled in the following cases.

The UL transmission of transmitting with the UL grant of the random access response uses the HARQ process identifier 0, and in this transmission, even if the HARQ feedback is included in the condition of disabling, the HARQ feedback is not disabled.

When the new data indicator in the DCI carried on the PDCCH corresponding to the HARQ process does not indicate new data (in a case of new data indicator bit=0), implementation may be performed so that the HARQ feedback is not disabled.

In the DCI notification in a case where the HARQ feedback has been disabled, there are a 4-bit notification region (HARQ process number) for notifying the HARQ process identifier and a 1-bit notification region (new data indicator (NDI)) for notifying either the first transmission or the retransmission. In a case where the HARQ feedback is disabled in all the HARQ processes (disabling in units of cell and units of component carrier, or the like), this notification region is an unnecessary region. Such an unnecessary notification region has applications such as zero padding and use in other applications. For example, such an unnecessary notification region may be used as a notification region of information regarding the error rate characteristic compensation means described below.

Next, the control unit (for example, the control unit 23) of the base station device (for example, the base station 20, the base station 30) transmits the DCI and the PDSCH data (hereinafter, PDSCH data) to the terminal device 50 by using the HARQ via radio communication (for example, the radio communication unit 21) (step S302). It is assumed that HARQ process #1 is assigned as the HARQ process identifier to the HARQ processing of the data transmission. The control unit (for example, the control unit 23) of the base station device (for example, the base station 20, the base station 30) holds the transmitted PDSCH data in the HARQ buffer of HARQ process #1 in the storage unit (for example, the storage unit 22) (step S303).

The control unit 55 of the terminal device 50 that has received the PDSCH data of the HARQ process #1 from the base station device decodes the PDSCH data. The UE (terminal device 50) starts drx-HARQ-RTT-TimerDL in response to the reception of the PDSCH data (that is, the fact that the PDCCH that has scheduled the PDSCH indicates DL transmission). Here, it is assumed that the PDSCH data of the HARQ process #1 has not been successfully decoded (step S304).

Due to the decoding failure of the PDSCH data of the HARQ process #1, the control unit 55 of the terminal device 50 transmits the NACK of the HARQ process #1 to the base station device via the radio communication unit 51 (step S305). Next, the control unit 55 of the terminal device 50 stores the PDSCH data of which decoding has failed in the HARQ buffer 522a of the HARQ process #1 in the storage unit 52 (step S306).

Next, the control unit (for example, the control unit 23) of the base station device (for example, the base station 20, the base station 30) transmits the PDSCH data of the HARQ process #2 to the terminal device 50 via radio communication (for example, the radio communication unit 21) (step S307).

In the HARQ process #2, retransmission processing is disabled (HARQ feedback disabling). Therefore, the control unit (for example, the control unit 23) of the base station device (for example, the base station 20, the base station 30) does not hold the transmitted PDSCH data in the HARQ buffer of HARQ process #2 in the storage unit (for example, the storage unit 22) (step S308).

The control unit 55 of the terminal device 50 that has received the PDSCH data of the HARQ process #2 from the base station device decodes the PDSCH data. Here, it is assumed that the PDSCH data of the HARQ process #2 has not been successfully decoded (step S309).

For the HARQ process #2, retransmission processing is disabled in advance notification (step S301). Therefore, the control unit 55 of the terminal device 50 does not hold the PDSCH data of which decoding has failed in the HARQ buffer of the HARQ process #2 in the storage unit 52 (step S310). Even when the PDCCH that has scheduled the received PDSCH data indicates DL transmission, the UE (the terminal device 50) does not start drx-HARQ-RTT-TimerDL if the feedback of the corresponding HARQ process is disabled. That is, in this case, drx-HARQ-RTT-TimerDL corresponding to the HARQ process #2 is not started. In other words, when the PDCCH for the UE indicates DL transmission, the UE (the terminal device 50) may perform operation of determining whether the HARQ feedback in the corresponding HARQ process is disabled, and not starting drx-HARQ-RTT-TimerDL when the corresponding HARQ process is disabled, and starting drx-HARQ-RTT-TimerDL when the corresponding HARQ process is enabled.

The control unit (for example, the control unit 23) of the base station device (for example, the base station 20, the base station 30) that has received the NACK of the HARQ process #1 retransmits the PDSCH data to the terminal device 50 via radio communication (for example, the radio communication unit 21) (step S311).

The control unit 55 of the terminal device 50 that has received the retransmission of the PDSCH data performs soft combining of the data stored in the HARQ buffer 522a of the HARQ process #1 and the retransmission data to decode the PDSCH data (step S312). Here, it is assumed that the PDSCH data is successfully decoded (step S313).

Due to the successful decoding of the PDSCH data, the control unit 55 of the terminal device 50 transmits the ACK of the HARQ process #1 to the base station device via the radio communication unit 51 (step S314). The control unit (for example, the control unit 23) of the base station device (for example, the base station 20, the base station 30) that has received the ACK of the HARQ process #1 clears data in the HARQ buffer of HARQ process #1 in the storage unit (for example, the storage unit 22) (step S315). As similar to this, the control unit 55 of the terminal device 50 that has transmitted the ACK of the HARQ process #1 clears data in the HARQ buffer 522a of the HARQ process #1 (step S316).

<2-11. Example of HARQ Disabling Processing (Uplink)>

Figure 12:
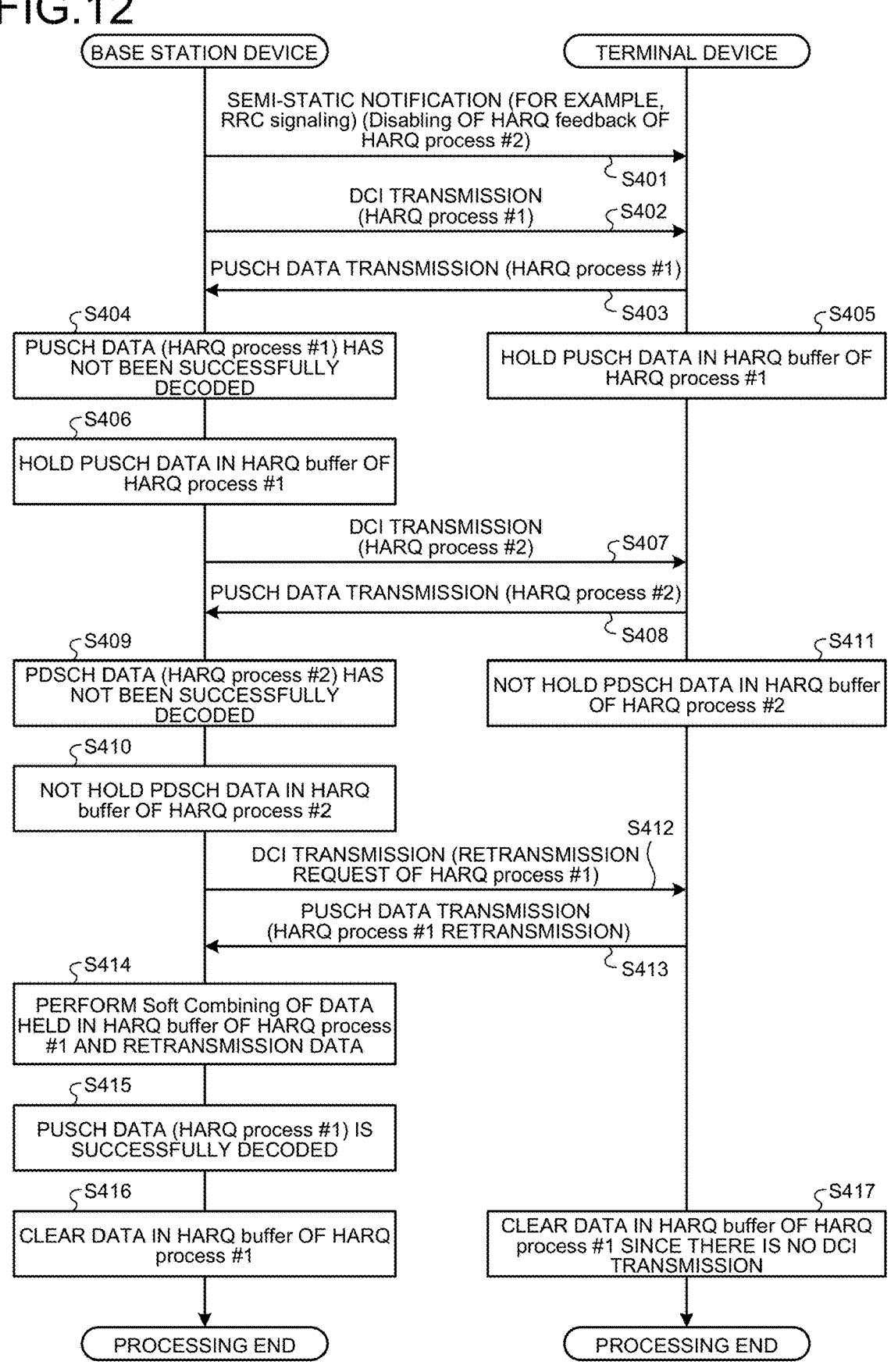
FIG. 12 is a sequence diagram illustrating an example of HARQ disabling processing according to an embodiment of the present disclosure.

FIG. 12 is a sequence diagram illustrating an example of HARQ disabling processing according to an embodiment of the present disclosure. Specifically, FIG. 12 illustrates HARQ feedback disabling in units of HARQ processes in the uplink as an example. In the case of FIG. 12, the HARQ process #1 is set to HARQ feedback enable, and the HARQ process #2 is set to HARQ feedback disable.

As illustrated in FIG. 12, first, as similar to step S301 described above, the control unit (for example, the control unit 23) of the base station device (for example, the base station 20, the base station 30) notifies to disable a predetermined HARQ process via radio communication (for example, the radio communication unit 21) (step S401).

Next, the control unit (for example, the control unit 23) of the base station device (for example, the base station 20, the base station 30) performs DCI transmission (HARQ process #1) via radio communication (for example, the radio communication unit 21) (step S402).

The control unit 55 of the terminal device 50 that has received the DCI transmission performs PUSCH data transmission (HARQ process #1) via the radio communication unit 51 (step S403). The control unit 55 of the terminal device 50 holds the PUSCH data transmitted to the HARQ buffer 522a of the HARQ process #1 in the storage unit 52 (step S405).

The control unit (for example, the control unit 23) of the base station device (for example, the base station 20, the base station 30) that has received the PUSCH data transmission (HARQ process #1) from the terminal device 50 decodes the PUSCH data. Here, it is assumed that the PUSCH data of the HARQ process #1 has not been successfully decoded (step S404).

Due to the decoding failure of the PUSCH data of the HARQ process #1, the control unit (for example, the control unit 23) of the base station device (for example, the base station 20, the base station 30) holds the PUSCH data of which decoding has failed in the HARQ buffer of the HARQ process #1 in the storage unit (for example, the storage unit 22) (step S406).

Next, the control unit (for example, the control unit 23) of the base station device (for example, the base station 20, the base station 30) performs DCI transmission (HARQ process #2) via radio communication (for example, the radio communication unit 21) (step S407).

The control unit 55 of the terminal device 50 that has received the DCI transmission performs PUSCH data transmission (HARQ process #2) via the radio communication unit 51 (step S408). For the HARQ process #2, retransmission processing is disabled in advance notification (step S401). Therefore, the control unit 55 of the terminal device 50 does not hold the transmitted PUSCH data in the HARQ buffer of the HARQ process #2 in the storage unit 52 (step S411).

The control unit (for example, the control unit 23) of the base station device (for example, the base station 20, the base station 30) that has received the PUSCH data transmission (HARQ process #2) from the terminal device 50 decodes the PUSCH data. Here, it is assumed that the PUSCH data of the HARQ process #2 has not been successfully decoded (step S409).

In the HARQ process #2, retransmission processing is disabled (HARQ feedback disabling). Therefore, the control unit (for example, the control unit 23) of the base station device (for example, the base station 20, the base station 30) does not hold the transmitted PUSCH data in the HARQ buffer of HARQ process #2 in the storage unit (for example, the storage unit 22) (step S410).

Next, the control unit (for example, the control unit 23) of the base station device (for example, the base station 20, the base station 30) performs DCI transmission (retransmission request of HARQ process #1) via radio communication (for example, the radio communication unit 21) (step S412).

The control unit 55 of the terminal device 50 that has received the DCI transmission (retransmission request of HARQ process #1) performs PUSCH data transmission (retransmission of HARQ process #1) via the radio communication unit 51 (step S413).

The control unit (for example, the control unit 23) of the base station device (for example, the base station 20, the base station 30) that has received the retransmission of the PUSCH data performs soft combining of the data stored in the HARQ buffer of the HARQ process #1 and the retransmission data to decode the PUSCH data (step S414). Here, it is assumed that the PUSCH data is successfully decoded (step S415).

Due to the successful decoding of the PUSCH data, the control unit (for example, the control unit 23) of the base station device (for example, the base station 20, the base station 30) clears data in the HARQ buffer of HARQ process #1 in the storage unit (for example, the storage unit 22) (step S416). Since there is no DCI transmission (retransmission request of HARQ process #1) from the base station device, the control unit 55 of the terminal device 50 clears the data in the HARQ buffer 522a of the HARQ process #1 (step S417).

<2-12. Characteristic Compensation Supporting HARQ Disabling>

When the HARQ feedback is disabled, retransmission cannot be performed even if a decoding error occurs, and thus it is important to reduce the decoding error at the time of initial transmission. Therefore, the control unit (for example, the control unit 23) of the base station device (for example, the base station 20, the base station 30) and the control unit 55 of the terminal device 50 reduce decoding errors by using the following techniques (A) to (C).

(A) CQI is extended at the same time as introducing of HARQ feedback disabling (B) The MCS Table is switched to a table with a low spectral efficiency at the same time as introducing of HARQ feedback disabling (C) When HARQ feedback disabling is enabled, switching is performed to repetition transmission of the same Transport Block (TB)

The technique (A) is, for example, as follows. In the HARQ process in which the HARQ feedback disabling is enabled, the determination is made on the basis of the extended CQI, and in the HARQ process in which the HARQ feedback disabling is disabled, the determination is made on the basis of the conventional CQI.

The base station device (for example, the base station 20, the base station 30) needs to know two types of CQIs, that is, a CQI for HARQ enabling (or a conventional CQI) and a CQI for HARQ disabling. As (a), the terminal device 50 returns one type of reference CQI (for example, a CQI for enabling, long term CQI, or the like). The control unit (the control unit 23) of the base station device (for example, the base station 20, the base station 30) determines an MCS by estimating one CQI (for example, a CQI for enabling) from the other CQI (for example, a CQI for disabling). Information that assists estimation (for example, an offset value between two types of QCIs) may be reported from the terminal device 50 to the base station device in advance.

As (b), the terminal device 50 returns two types of CQIs (both the CQI for enabling and the CQI for disabling). The base station device (for example, the base station 20, the base station 30) determines the MCS on the basis of the CQIs. Then, the terminal device 50 feeds back two types of CQI indexes.

When both the CQI for HARQ enabling and the CQI for HARQ disabling are defined, the target BLER is also defined for the both. For example, the definition is performed so that Target BLER=0.1 of the CQI for HARQ enabling, Target BLER=0.00001 of the CQI for HARQ disabling, and the like.

The CQI table is as follows.

When both the CQI for HARQ feedback enabling and the CQI for HARQ feedback disabling are defined, both the CQI tables need to be defined.

A CQI table corresponding to the new Target BLER is added.

The calculation may be performed on the basis of an existing CQI table. For example, a code rate obtained by multiplying a code rate of the existing table by a coefficient less than 1 is used.

A value obtained by decreasing Modulation in the existing table by one step may be used. For example, the value is obtained by decreasing from 256 QAM to 64 QAM, from 64 QAM to 16 QAM, from 16 QAM to QPSK, or from QPSK to BPSK. In the case of QPSK, QPSK is maintained.

The CQI calculation method is as follows.

A CSI reference resource is assumed as follows.

1) Repetition is performed a predetermined number of times.

2) When the repetition is plural times, the redundancy version is set to [0, 0, 0, 0], [0, 2, 3, 1], or [0, 3, 0, 3].

3) The calculation means is switched for enabling or disabling the HARQ process. For example, the calculation method of the CSI reference resource is changed for each HARQ process.

4) A CQI offset is added. For example, when the CQI offset=1 and the CQI calculation result is CQI=8, CQI=7 is reported.

The technique (B) is, for example, as follows. In the HARQ process in which the HARQ feedback disabling is enabled, determination is performed on the basis of the MCS Table of a lower spectral efficiency than that of other MCS Tables. In the HARQ process in which the HARQ feedback disabling is disabled, determination is performed on the basis of the MCS Table of a higher spectral efficiency than that of other MCS Tables.

When both the MCS for HARQ feedback enabling and the MCS for HARQ feedback disabling are defined, the MCS table is defined for both of them. For example, the MCS Table for HARQ feedback enabling uses the existing MCS table 1 or 2, and the MCS Table for HARQ feedback disabling uses the existing MCS table 3.

Alternatively, the calculation may be performed on the basis of an existing MCS table. For example, a code rate obtained by multiplying a code rate of the existing table by a coefficient less than 1 may be used.

A value obtained by decreasing Modulation in the existing table by one step may be used. For example, the value is obtained by decreasing from 256 QAM to 64 QAM, from 64 QAM to 16 QAM, from 16 QAM to QPSK, or from QPSK to BPSK. In the case of QPSK, QPSK is maintained.

When both the MCS for HARQ enabling and the MCS for HARQ disabling are defined, the target BLER is also defined for the both. For example, the definition is performed so that Target BLER=0.1 of the CQI for HARQ enabling, Target BLER=0.00001 of the CQI for HARQ disabling, and the like.

The technique (C) is, for example, as follows. The repetition transmission may be transmission in the same redundancy version (RV) or may be transmission in different RVs. In the HARQ process in which the HARQ feedback disabling is enabled, repetition of the same TB may be transmitted, and in the HARQ process in which the HARQ feedback disabling is disabled, a single TB may be transmitted. In the HARQ process in which the HARQ feedback disabling is enabled, the number of times of repetition transmission of the same TB may be increased, and in the HARQ process in which the HARQ feedback disabling is disabled, transmission may be performed without increasing the number of times of repetition transmission of the same TB.

<3-1. Modification in a Case where the Number of Harq Processes can be Increased>

Next, a modification in a case where the number of HARQ processes in the terminal device 50 can be increased (including HARQ feedback enabling after HARQ feedback disabling) will be described.

The terminal device 50 that can increase the number of HARQ processes and the buffer size related to the HARQ buffer transmits capability information (UE radio access capability) to a non-terrestrial network (for example, a base station device) under the control of the control unit 55. The timing of transmitting the capability information may be a response to Enquiry output from the RAN (satellite) immediately after the RRC is connected. Alternatively, the timing may be the time of RRC setup completion.

Here, the capability information includes the following information.

Information on whether the number of HARQ processes can be increased

Information on whether the buffer size can be increased

Maximum supported size information of the number of HARQ processes

Maximum supported size information of the buffer size

In a case where the number of HARQ processes is decreased or increased, the control unit 55 of the terminal device 50 notifies information regarding switching to increase or decrease the number of HARQ processes or to return the value to the default value. This notification includes an explicit notification and an implicit notification.

The explicit notification is, for example, a notification in system information, RRC signaling, or MAC CE, or a notification in DCI or UCI. In this explicit notification, information for notifying switching of the maximum number may be added. When performing HO from TN to NTN, a notification may be included in the HO command (RRCReconfiguration including ReconfigurationWithSync).

In the implicit notification, the terminal device 50 makes a notification to determine whether to disable the HARQ feedback on the basis of system information or another information notified by RRC signaling. For example, in the implicit notification, the terminal device 50 may determine disabling with the following information in system information or the like.

Position information of base station device and terminal device 50

Propagation distance and propagation delay information between base station device and terminal device 50

Altitude of base station device and terminal device 50

Moving speed of base station device and terminal device 50

Timing advance information

For example, in a case where the timing advance is larger than a predetermined value, the control unit 55 of the terminal device 50 may increase the number of processes. In a case where the timing advance is smaller than a predetermined value, the control unit 55 may decrease the number of HARQ processes or return the value to the default value.

The control unit 55 of the terminal device 50 may determine the number of HARQ processes on the basis of the information regarding power control. For example, when power control is larger than a predetermined value, the number of HARQ processes may be increased. In a case where the power control is smaller than a predetermined value, the control unit 55 may decrease the number of HARQ processes or return the value to the default value.

The control unit 55 of the terminal device 50 may notify the number of HARQ processes. This notification includes an explicit notification and an implicit notification.

The explicit notification is, for example, a notification in system information, RRC signaling, or MAC CE. In this notification, there is a method of notifying an absolute value of the number of HARQ processes, or notifying the number of HARQ processes by switching the number of HARQ processes in a plurality of patterns (switching in four patterns of 16, 32, 48, and 64, or the like).

The explicit notification includes notification in the DCI or the UCI. In the notification in the DCI or the UCI, a field for notifying the number of HARQ processes is added.

When performing HO from TN to NTN, a notification may be included in the HO command (RRCReconfiguration including ReconfigurationWithSync).

In the implicit notification, the terminal device 50 makes a notification to determine whether to disable the HARQ feedback on the basis of system information or another information notified by RRC signaling. For example, in the implicit notification, the terminal device 50 may determine disabling with the following information in system information or the like.

Position information of base station device and terminal device 50

Propagation distance and propagation delay information between base station device and terminal device 50

Altitude of base station device and terminal device 50

Moving speed of base station device and terminal device 50

Timing advance information

For example, the control unit 55 of the terminal device 50 determines the number of HARQ processes according to the value of timing advance. The control unit 55 of the terminal device 50 may determine the number of HARQ processes according to the value of the power control. The control unit 55 of the terminal device 50 may perform notification with other physical information of the PDCCH (CORESET, search space, scrambling (DMRS, RNTI)).

In the control unit (for example, the control unit 23) of the base station device (for example, the base station 20, the base station 30) and the control unit 55 of the terminal device 50, methods of notifying the HARQ process identifier after the increase or decrease in the number of HARQ processes are as follows.

(A) A case where the HARQ process identifier is explicitly notified

The number of bits of the notification field in the HARQ process of the DCI is increased.

The HARQ process identifier is notified with the UCI.

(B) A case where the HARQ process identifier is implicitly notified

Notification is performed with other physical information of PDCCH (CORESET, search space, scrambling (DMRS, RNTI)).

When the DCI is notified by CORESET #A, the HARQ process identifier is read as #0 to 15, and when the DCI is notified by CORESET #B, the HARQ process identifier is read as #(0 to 15)+16.

The interpretation of the HARQ process identifier notified by the DCI is changed with the slot number (or SFN).

For example, when the DCI is notified by Slot #0, the HARQ process identifier is read as #0 to 15, and when the DCI is notified by Slot #1, the HARQ process identifier is read as #(0 to 15)+16. When the DCI is notified by a slot of an even number, the HARQ process identifier is read as #0 to 15, and when the DCI is notified by a slot of an odd number, the HARQ process identifier is read as #(0 to 15)+16. An even number and an odd number may be reversed.

Notification is performed by reference signal sequence/port. For example, switching is performed by DMRS sequence initialization notified by the DCI. When the DMRS sequence initialization is 0, the HARQ process identifier is read as #0 to 15, and when the DMRS sequence initialization is 1, the HARQ process identifier is read as #(0 to 15)+16. Alternatively, switching may be performed using an antenna port. For example, when transmission and reception are performed by Antenna port #0, the HARQ process identifier is read as #0 to 15, and when transmission and reception are performed by Antenna port #1, the HARQ process identifier is read as #(0 to 15)+16.

The DRX operation when the number of HARQ processes is increased (including an increase (recovery) in the number of HARQ processes that can be fed back by HARQ feedback enabling) or decreased (including a decrease in the number of HARQ processes that can be fed back by HARQ feedback disabling) is as follows.

For example, the HARQRTTTimer (drx-HARQ-RTT-TimerDL, drx-HARQ-RTT-TimerUL) and the drx-RetransmissionTimer (drx-RetransmissionTimerDL, drx-RetransmissionTimerUL) used in the NTN communication may have different values set by the RAN from the HARQRTT-Timer (drx-HARQ-RTT-TimerDL, drx-HARQ-RTT-TimerUL) and the drx-RetransmissionTimer (drx-RetransmissionTimerDL, drx, and the drx-RetransmissionTimer (drx-RetransmissionTimerDL, drx-RetransmissionTimerUL) used in the TN communication.

One HARQRTTTimer and one drx-RetransmissionTimer are associated with one HARQ process. Therefore, for example, if the number of HARQ processes used in NTN communication is larger than the number of HARQ processes used in TN communication, the frequency of start/ stop of HARQRTTTimer and drx-RetransmissionTimer may also be high. When the frequency of start of the drx-RetransmissionTimer increases, the frequency and time (for example, active time) of PDCCH monitoring also increase, which may be inconvenient from the viewpoint of UE power saving.

Therefore, when the number of HARQ processes used in NTN communication is larger than the number of HARQ processes used in TN communication, at least a value of drx-RetransmissionTimer used in NTN communication may be set to be smaller than a value of drx-RetransmissionTimer used in TN communication. As a result, even in a case where the number of HARQ processes is larger than the number of HARQ processes, the total running period of the drx-RetransmissionTimer to be monitored by the UE in the PDCCH monitoring in the NTN communication is shorter than a simple product of the number of running HARQ processes in the NTN communication and the value of the drx-RetransmissionTimer used in the TN communication. Therefore, the effect of the present embodiment can be exerted while maintaining the UE power saving.

In the NTN communication, a difference between a timing at which a certain transmission signal transmitted from a transmission source should reach a reception source and a timing at which the transmission signal is actually received may be larger than that in the TN communication. An RTT between a base station (RAN) and a mobile station (UE) in NTN communication may be larger than an RTT in TN communication. These may be due to the length of distance between the base station (RAN) and the mobile station (UE). Therefore, in order to absorb the deviation, values of HARQRTTTimer and drx-RetransmissionTimer for NTN communication may be set to values larger than values of HARQRTTTimer and drx-RetransmissionTimer for TN communication.

The values of HARQRTTTimer and drx-RetransmissionTimer used in NTN communication may be set (for example, included in DRX-Config) separately from the values of HARQRTTTimer and drx-RetransmissionTimer used in TN communication and transmitted from the RAN to the UE, or may be set in the UE in advance as default-DRX-Config for NTN communication.

When the UE can communicate with the base station of TN communication and the base station of NTN communication in the RRC connected state (for example, in a case where the dual connectivity in which the base station of TN communication is an MN and the base station of NTN communication is an SN is set, or in a case where the base station of TN communication is an anchor carrier and NTN communication is performed with the base station of NTN communication), both the values of HARQRTTTimer and drx-RetransmissionTimer used in the NTN communication and the values of HARQRTTTimer and drx-Retransmission-Timer used in the TN communication may be included in one RRCReconfiguration and transmitted.

Note that the HARQRTTTimer and the drx-Retransmis-sionTimer described above may be a DL timer (for example, drx-HARQ-RTT-TimerDL and drx-RetransmissionTim-erDL), a UL timer (for example, drx-HARQ-RTT-TimerUL and drx-RetransmissionTimerUL), or both of them.

Each of the values of HARQRTTTimer and drx-Retrans-missionTimer described above may be set to a value in units of subframes or value in units of symbols. The values of the HARQRTTTimer and the drx-RetransmissionTimer described above may be set to values in units of PDCCH period (pp). When the values of the HARQRTTTimer and the drx-RetransmissionTimer are in units of PDCCH period (pp), by multiplying a value corresponding to the own coverage level of the UE (indication based on radio quality, for example, the coverage enhancement level), the values of the HARQRTTTimer and the drx-RetransmissionTimer to be actually used by the UE may be derived. The value corresponding to the own coverage level of the UE may be transmitted from the RAN to the UE by RRC signalling (for example, RRCReconfiguration).

<3-2. Other Modifications>

For example, in 3GPP Rel. 15, a transmission timing of HARQ Feedback (ACK/NACK) is specified as follows. In the case of a DCI format 1_0, the DCI includes a PDSCH-to-HARQ-timing-indicator field, and its value is mapped to $\{1, 2, 3, 4, 5, 6, 7, 8\}$. When the reception of the PDSCH (Semi-Persistent Scheduling (SPS) PDSCH) is finished in the slot n, the UE transmits a PUCCH (i.e., HARQ Feedback (ACK/NACK)) in the slot n+k. Here, k is provided by the PDSCH-to-HARQ-timing-indicator field of the DCI format 1_0. In the case of the DCI format 1_1, the PDSCH-to-HARQ-timing-indicator field (0, 1, 2, or 3 bits) included in the DCI is mapped to the number of slots of the PUCCH in which the HARQ feedback is to be transmitted, and indicates a value of the values provided by dl-DataToUL-ACK of the RRC parameter that is to be referred to. That is, using a value of dl-DataToUL-ACK corresponding to a combination of bits indicated by the PDSCH-to-HARQ-timing-indicator field in the DCI format 1_1 as k, the UE transmits a PUCCH (i.e., HARQ Feedback (ACK/NACK)) in the slot n+k. The dl-DataToUL-ACK may be transmitted from the RAN to the UE in the semi-static notification described above.

A relationship between the PDSCH-to-HARQ-timing-indicator field and the value of the dl-DataToUL-ACK to be used in a case of the DCI format 1_1 is as Table 1.

TABLE 1

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
| | '10' | '010' | $3^{rd}$ value provided by dl-DataToUL-ACK |
| | '11' | '011' | $4^{th}$ value provided by dl-DataToUL-ACK |
| | | '100' | $5^{th}$ value provided by dl-DataToUL-ACK |
| | | '101' | $6^{th}$ value provided by dl-DataToUL-ACK |
| | | '110' | $7^{th}$ value provided by dl-DataToUL-ACK |
| | | '111' | $8^{th}$ value provided by dl-DataToUL-ACK |

In a case where the timing (any of the conditions (a-1, a-2, b-1, b-2) described above) at which the HARQ feedback is dynamically disabled/enabled is earlier than the slot n+k in which the PUCCH (i.e., HARQ Feedback (ACK/NACK)) indicated by the PDSCH-to-HARQ-timing-indicator field included in the DCI is to be transmitted, the UE (the terminal device 50) may ignore the value of the PDSCH-to-HARQ-timing-indicator field. That is, the HARQ feedback may not be performed. More specifically, in a case where the subframe n+k or the slot n+k indicated by the above-described condition (a-2) is earlier than the slot n+k in which the PUCCH (i.e., HARQ Feedback (ACK/NACK)) indicated by the PDSCH-to-HARQ-timing-indicator field included in the DCI is to be transmitted, the UE (the terminal device 50) may ignore the value of the PDSCH-to-HARQ-timing-indicator field. In other words, in a case where the subframe n+k or the slot n+k indicated by the above-described condition (a-2) is earlier than the slot n+k in which the PUCCH (i.e., HARQ Feedback (ACK/NACK)) indicated by the PDSCH-to-HARQ-timing-indicator field included in the DCI is to be transmitted, the UE (the terminal device 50) is not expected to transmit the PUCCH (i.e., HARQ Feedback (ACK/NACK)) in the slot n+k derived from the PDSCH-to-HARQ-timing-indicator field. In this case, the notification indicating the timing (e. g., n+k) at which the HARQ feedback disabling is performed and the PDSCH-to-HARQ-timing-indicator field may be included in the same DCI or may be included in separate DCIs.

In the embodiment of the present disclosure, the enabling/disabling target has been described as the HARQ feedback, but the enabling/disabling target may be the HARQ process itself or processing in a HARQ process other than the HARQ feedback.

The above-described enabling/disabling may also be referred to as activation/deactivation. The control device that controls the management device 10, the base stations 20, 30, 40, or the terminal device 50 of the present embodiment may be achieved by a dedicated computer system or a general-purpose computer system.

For example, a communication program for executing the above-described operation (for example, initial access processing, HARQ processing, and the like) is stored in a computer-readable recording medium such as an optical disk, a semiconductor memory, a magnetic tape, or a flexible disk and is distributed. For example, the program is installed in a computer, and the above-described processing is performed to configure the control device. At this time, the control device may be a device (for example, a personal computer) outside the management device 10, the base stations 20, 30, 40, or the terminal device 50. The control device may be a device (for example, the control unit 13, the control unit 23, or the control unit 55) inside the base stations 20, 30, 40 or the terminal device 50.

The above-described communication program may be stored in a disk device included in a server device on a network such as the Internet so that the communication program can be downloaded to a computer. The above-described functions may be achieved by cooperation of an operating system (OS) and application software. In this case, a portion other than the OS may be stored in a medium and distributed, or a portion other than the OS may be stored in a server device and downloaded to a computer.

Among the processes described in each of the above embodiments, all or part of the processes described as being automatically performed can be manually performed, or all or part of the processes described as being manually performed can be automatically performed by a known method. The processing procedure, specific name, and information including various data and parameters indicated in the above document and drawings can be arbitrarily changed unless otherwise specified. For example, the various types of information illustrated in each drawing is not limited to the illustrated information.

Each component of each of the illustrated devices is a functional concept, and does not necessarily have to be physically configured as illustrated in the drawings. That is, the specific form of distribution/integration of each device is not limited to the one illustrated in the drawing, and all or part of the device can be configured by being functionally or physically distributed/integrated in arbitrary units according to various loads and usage conditions.

The above-described embodiments and modifications can be appropriately combined as long as the processing contents do not contradict each other. The order of each step illustrated in the flowchart or sequence diagram of each embodiment described above can be changed as appropriate.

4. CONCLUSION

As described above, according to an embodiment of the present disclosure, the terminal device 50 can receive a notification to disable the feedback for retransmission in HARQ and disable the feedback for retransmission (HARQ feedback disabling). This can contribute to elimination of a shortage of the number of HARQ processes, and can contribute to suppression of deterioration of communication quality.

Although the embodiments of the present disclosure have been described above, the technical scope of the present disclosure is not limited to the above-described embodiments as it is, and various modifications can be made without departing from the gist of the present disclosure. Components of different embodiments and modifications may be appropriately combined.

The effects in each embodiment described in the present specification are merely examples and are not limited, and there may be other effects.

Note that the present technology can also have the following configurations.

(1)

A terminal device comprising a communication unit and a control unit, wherein the control unit is configured to receive disabling information of hybrid automatic repeat request (HARQ) feedback via the communication unit, and recognize that one or more pieces of HARQ feedback indicated by the disabling information of the HARQ feedback are disabled, and the disabling information of the HARQ feedback is set for each cell, each beam, each component carrier, each bandwidth part (BWP), each user equipment (UE), or each HARQ process.

(2)

The terminal device according to (1), wherein the disabling information of the HARQ feedback is transmitted in any one of semi-static notification, dynamic notification, and a combination of the semi-static notification and the dynamic notification from a base station device.

(3)

The terminal device according to (2), wherein the semi-static notification is signal notification of radio resource control (RRC).

(4)

The terminal device according to (2) or (3), wherein the dynamic notification is notification of downlink control information (DCI) or uplink control information (UCI).

(5)

The terminal device according to any one of (1) to (4), wherein the disabling information of the HARQ feedback includes a number of disabled HARQ processes among one or more HARQ processes.

(6)

The terminal device according to any one of (1) to (5), wherein the disabling information of the HARQ feedback includes identification information of a disabled HARQ process among one or more HARQ processes.

(7)

The terminal device according to any one of (1) to (6), wherein the control unit switches compensation of an error rate characteristic according to switching from a HARQ process in which retransmission is not disabled to a HARQ process in which retransmission is disabled based on the disabling information of the HARQ feedback.

(8)

The terminal device according to (7), wherein, in response to switching to the HARQ process in which the retransmission is disabled, the control unit makes compensation for the error rate characteristic lower than that in a case of the HARQ process in which the retransmission is not disabled.

(9)

The terminal device according to any one of (1) to (8), wherein the control unit transmits information on an increase or decrease via the communication unit in accordance with the increase or decrease in the number of the one or more HARQ processes.

(10)

A base station device comprising a communication unit and a control unit, wherein the control unit is configured to transmit disabling information of hybrid automatic repeat request (HARQ) feedback via the communication unit, and recognize that one or more HARQ processes indicated by the disabling information of the HARQ feedback are disabled, and the disabling information of the HARQ feedback is set for each cell, each beam, each component carrier, each bandwidth part (BWP), each user equipment (UE), or each HARQ process.

(11)

The base station device according to (10), wherein the control unit transmits the disabling information of the HARQ feedback in any one of semi-static notification, dynamic notification, and a combination of the semi-static notification and the dynamic notification.

(12)

The base station device according to (11), wherein the semi-static notification is signal notification of radio resource control (RRC).

(13)

The base station device according to (11) or (12), wherein the dynamic notification is notification of downlink control information (DCI) or uplink control information (UCI).

(14)

The base station device according to any one of (10) to (13), wherein the disabling information of the HARQ feedback includes a number of disabled HARQ processes among the one or more HARQ processes.

(15)

The base station device according to any one of (10) to (14), wherein the disabling information of the HARQ feedback includes identification information of a disabled HARQ process among the one or more HARQ processes.

(16)

The base station device according to any one of (10) to (15), wherein the control unit switches compensation of an error rate characteristic according to switching from a HARQ process in which retransmission is not disabled to a HARQ process in which retransmission is disabled based on the disabling information of the HARQ feedback.

(17)

The base station device according to (16)

wherein, in response to switching to the HARQ process in which the retransmission is disabled, the control unit makes compensation for the error rate characteristic lower than that in a case of the HARQ process in which the retransmission is not disabled.

(18)

A method for controlling a terminal device, the method comprising:

receiving disabling information of hybrid automatic repeat request (HARQ) feedback via a communication unit;

recognizing that one or more HARQ processes indicated by the disabling information of the HARQ feedback are disabled; and setting the disabling information of the HARQ feedback for each cell, each beam, each component carrier, each bandwidth part (BWP), each user equipment (UE), or each HARQ process.

(19)

A method for controlling a base station device, the method comprising:

transmitting disabling information of hybrid automatic repeat request (HARQ) feedback via a communication unit;

recognizing that one or more HARQ processes indicated by the disabling information of the HARQ feedback are disabled; and setting the disabling information of the HARQ feedback for each cell, each beam, each component carrier, each bandwidth part (BWP), each user equipment (UE), or each HARQ process.

REFERENCE SIGNS LIST

1 COMMUNICATION SYSTEM
10 MANAGEMENT DEVICE
11 COMMUNICATION UNIT
12, 22, 52 STORAGE UNIT
13, 23, 55 CONTROL UNIT
20, 30, 40 BASE STATION
21, 51 RADIO COMMUNICATION UNIT
50 TERMINAL DEVICE
53 NETWORK COMMUNICATION UNIT
54 INPUT AND OUTPUT UNIT
211 RECEPTION PROCESSING UNIT

211*a*, 511*a* RADIO RECEIVING UNIT
211*b*, 511*b* DEMULTIPLEXING UNIT
211*c*, 511*c* DEMODULATION UNIT
211*d*, 511*d* DECODING UNIT
212 TRANSMISSION PROCESSING UNIT
212*a*, 512*a* ENCODING UNIT
212*b*, 512*b* MODULATION UNIT
212*c*, 512*c* MULTIPLEXING UNIT
212*d*, 512*d* RADIO TRANSMITTING UNIT
213, 513 ANTENNA
521, 522, 523 STORAGE REGION
521*a*, 522*a*, 523*a* HARQ BUFFER
ABP1 AIR BORNE PLATFORM
C2 CELL
CN CORE NETWORK
D1 RADIUS
PN PUBLIC NETWORK
R1 ANGLE
RAN RADIO ACCESS NETWORK
SBP1, SBP2 SPACE BORNE PLATFORM
TN1, TN2 TERRESTRIAL NETWORK

The invention claimed is:

1. A terminal device comprising
a communication unit and a control unit,
wherein the control unit is configured to
receive disabling information of hybrid automatic repeat
  request (HARQ) feedback via the communication unit,
  and
recognize that one or more pieces of HARQ feedback
  indicated by the disabling information of the HARQ
  feedback are disabled, and
the disabling information of the HARQ feedback is set for
  each HARQ process,
wherein the disabling information of the HARQ feedback
  is transmitted in semi-static notification from a base
  station device,
wherein the semi-static notification is RRC Setup,
wherein the disabling information of the HARQ feedback
  includes identification information of a disabled HARQ
  process among one or more HARQ processes,
wherein the disabling information of the HARQ feedback
  indicates starting HARQ-RTT-TimerDL when one or
  more pieces of HARQ feedback indicated by the dis-
  abling information of the HARQ feedback are enabled,
wherein the control unit is further configured to: start the
  HARQ-RTT-TimerDL for a corresponding HARQ pro-
  cess in a first symbol after a last symbol of a corre-
  sponding transmission carrying the HARQ feedback
  when one or more pieces of HARQ feedback indicated
  by the disabling information of the HARQ feedback are
  enabled,
wherein the HARQ-RTT-TimerDL is for Non-Terrestrial
  Network (NTN) communication,
wherein a value of the HARQ-RTT-TimerDL for NTN
  communication is larger than a value of a HARQ-RTT-
  TimerDL for a Terrestrial Network (TN) communica-
  tion.
2. The terminal device according to claim 1,
wherein the dynamic notification is notification of down-
  link control information (DCI) or uplink control infor-
  mation (UCI).
3. The terminal device according to claim 1,
wherein the disabling information of the HARQ feedback
  includes a number of disabled HARQ processes among
  one or more HARQ processes.

4. The terminal device according to claim 1,
wherein the control unit switches compensation of an
  error rate characteristic according to switching from a
  HARQ process in which retransmission is not disabled
  to a HARQ process in which retransmission is disabled
  based on the disabling information of the HARQ feed-
  back.
5. The terminal device according to claim 4,
wherein, in response to switching to the HARQ process in
  which the retransmission is disabled, the control unit
  makes compensation for the error rate characteristic
  higher than that in a case of the HARQ process in
  which the retransmission is not disabled.
6. The terminal device according to claim 1,
wherein the control unit transmits information on an
  increase or decrease via the communication unit in
  accordance with the increase or decrease in the number
  of the one or more HARQ processes.
7. A base station device comprising
a communication unit and a control unit,
wherein the control unit is configured to
transmit disabling information of hybrid automatic repeat
  request (HARQ) feedback via the communication unit,
  and
recognize that one or more HARQ processes indicated by
  the disabling information of the HARQ feedback are
  disabled, and
the disabling information of the HARQ feedback is set for
  each HARQ process,
wherein the control unit transmits the disabling informa-
  tion of the HARQ feedback in semi-static notification,
wherein the semi-static notification is RRC Setup,
wherein the disabling information of the HARQ feedback
  includes identification information of a disabled HARQ
  process among the one or more HARQ processes,
wherein the disabling information of the HARQ feedback
  indicates starting HARQ-RTT-TimerDL when one or
  more pieces of HARQ feedback indicated by the dis-
  abling information of the HARQ feedback are enabled,
wherein the control unit is further configured to: start the
  HARQ-RTT-TimerDL for a corresponding HARQ pro-
  cess in a first symbol after a last symbol of a corre-
  sponding transmission carrying the HARQ feedback
  when one or more pieces of HARQ feedback indicated
  by the disabling information of the HARQ feedback are
  enabled,
wherein the HARQ-RTT-TimerDL is for Non-Terrestrial
  Network (NTN) communication,
wherein a value of the HARQ-RTT-TimerDL for NTN
  communication is larger than a value of a HARQ-RTT-
  TimerDL for a Terrestrial Network (TN) communica-
  tion.
8. The base station device according to claim 7,
wherein the dynamic notification is notification of down-
  link control information (DCI) or uplink control infor-
  mation (UCI).
9. The base station device according to claim 7,
wherein the disabling information of the HARQ feedback
  includes a number of disabled HARQ processes among
  the one or more HARQ processes.
10. The base station device according to claim 7,
wherein the control unit switches compensation of an
  error rate characteristic according to switching from a
  HARQ process in which retransmission is not disabled
  to a HARQ process in which retransmission is disabled
  based on the disabling information of the HARQ feed-
  back.

11. The base station device according to claim 10, wherein, in response to switching to the HARQ process in which the retransmission is disabled, the control unit makes compensation for the error rate characteristic higher than that in a case of the HARQ process in which the retransmission is not disabled.

12. A method for controlling a terminal device, the method comprising:

receiving disabling information of hybrid automatic repeat request (HARQ) feedback via a communication unit;

recognizing that one or more HARQ processes indicated by the disabling information of the HARQ feedback are disabled; and setting the disabling information of the HARQ feedback for each HARQ process, wherein the disabling information of the HARQ feedback is transmitted in semi-static notification from a base station device, wherein the semi-static notification is RRC Setup, wherein the disabling information of the HARQ feedback includes identification information of a disabled HARQ process among one or more HARQ processes, wherein the disabling information of the HARQ feedback indicates starting HARQ-RTT-TimerDL when one or more pieces of HARQ feedback indicated by the disabling information of the HARQ feedback are enabled, wherein the control unit is further configured to: start the HARQ-RTT-TimerDL for a corresponding HARQ process in a first symbol after a last symbol of a corresponding transmission carrying the HARQ feedback when one or more pieces of HARQ feedback indicated by the disabling information of the HARQ feedback are enabled, wherein the HARQ-RTT-TimerDL is for Non-Terrestrial Network (NTN) communication, wherein a value of the HARQ-RTT-TimerDL for NTN communication is larger than a value of a HARQ-RTT-TimerDL for a Terrestrial Network (TN) communication.

13. A method for controlling a base station device, the method comprising:

transmitting disabling information of hybrid automatic repeat request (HARQ) feedback via a communication unit;

recognizing that one or more HARQ processes indicated by the disabling information of the HARQ feedback are disabled; and setting the disabling information of the HARQ feedback for each HARQ process, wherein the control unit transmits the disabling information of the HARQ feedback in semi-static notification, wherein the semi-static notification is RRC Setup, wherein the disabling information of the HARQ feedback includes identification information of a disabled HARQ process among the one or more HARQ processes, wherein the disabling information of the HARQ feedback indicates starting HARQ-RTT-TimerDL when one or more pieces of HARQ feedback indicated by the disabling information of the HARQ feedback are enabled, wherein the control unit is further configured to: start the HARQ-RTT-TimerDL for a corresponding HARQ process in a first symbol after a last symbol of a corresponding transmission carrying the HARQ feedback when one or more pieces of HARQ feedback indicated by the disabling information of the HARQ feedback are enabled, wherein the HARQ-RTT-TimerDL is for Non-Terrestrial Network (NTN) communication, wherein a value of the HARQ-RTT-TimerDL for NTN communication is larger than a value of a HARQ-RTT-TimerDL for a Terrestrial Network (TN) communication.

* * * * *